Dec. 14, 1965     W. E. GRAYBEAL ETAL     3,223,255
SEMI-AUTOMATIC CONVEYOR CONTROL SYSTEM
Filed Nov. 4, 1960                         19 Sheets-Sheet 4
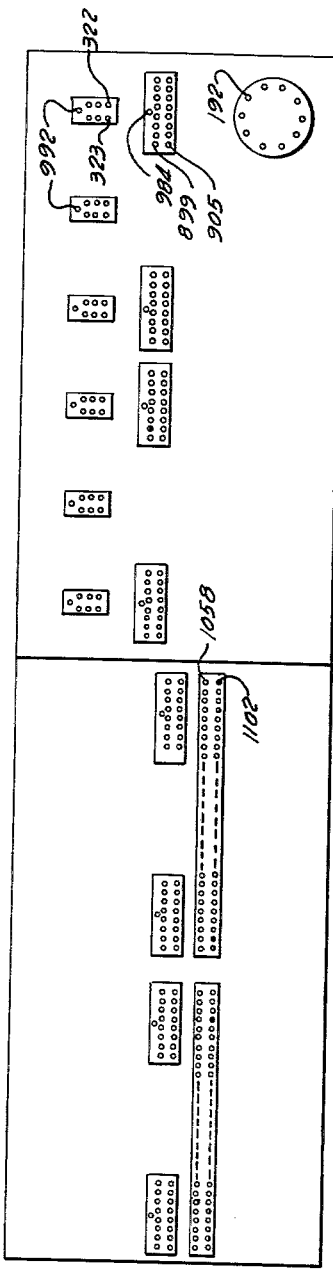
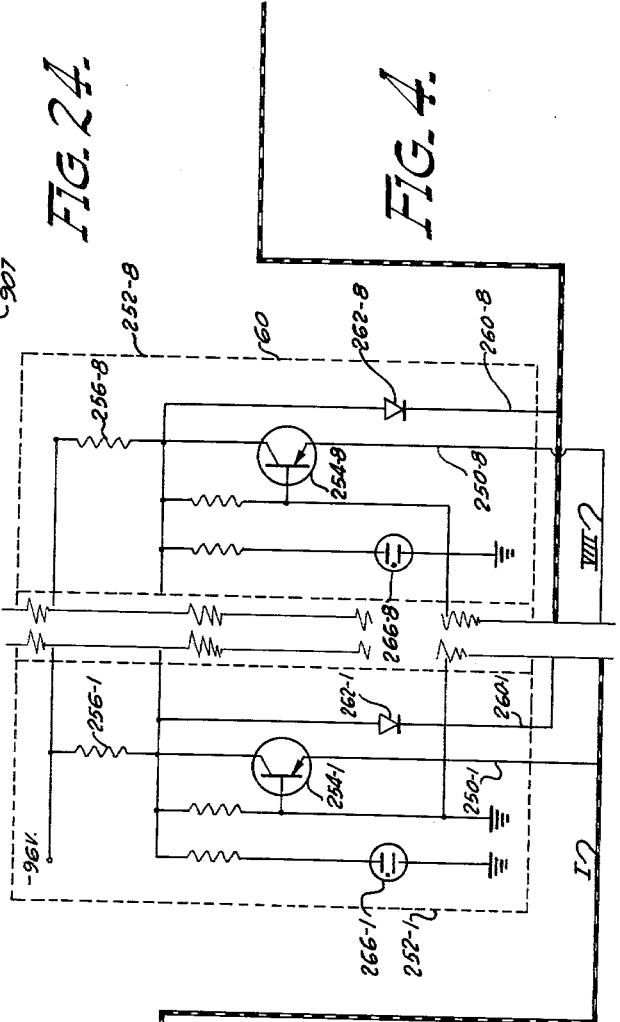
FIG. 24.
FIG. 4.
INVENTORS
Warren E. Graybeal
William C. Smith.
By A. G. Douvas
Attorney.

INVENTORS
Warren E. Graybeal
William C. Smith

By *A. G. Duvac*
Attorney

INVENTORS
Warren E. Graybeal
William C. Smith

By A. G. Douvas
Attorney.

INVENTORS
Warren E. Graybeal
William C. Smith

By A. G. Douras
Attorney

INVENTORS
Warren E. Graybeal
William C. Smith

By R. G. Downs
Attorney

INVENTORS
Warren E. Graybeal
William C. Smith

INVENTORS
Warren E. Graybeal
William C. Smith

Dec. 14, 1965   W. E. GRAYBEAL ETAL   3,223,255
SEMI-AUTOMATIC CONVEYOR CONTROL SYSTEM
Filed Nov. 4, 1960   19 Sheets-Sheet 18

INVENTORS.
Warren E. Graybeal
William C. Smith

BY *(signature)*
Attorney

Dec. 14, 1965   W. E. GRAYBEAL ETAL   3,223,255
SEMI-AUTOMATIC CONVEYOR CONTROL SYSTEM
Filed Nov. 4, 1960   19 Sheets-Sheet 19
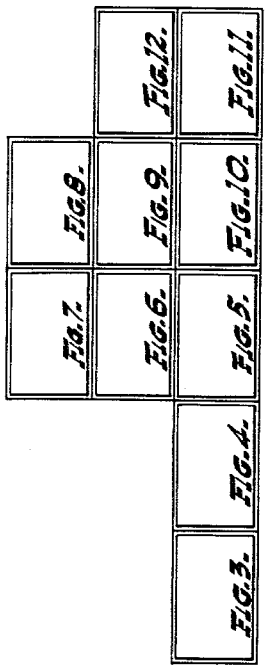
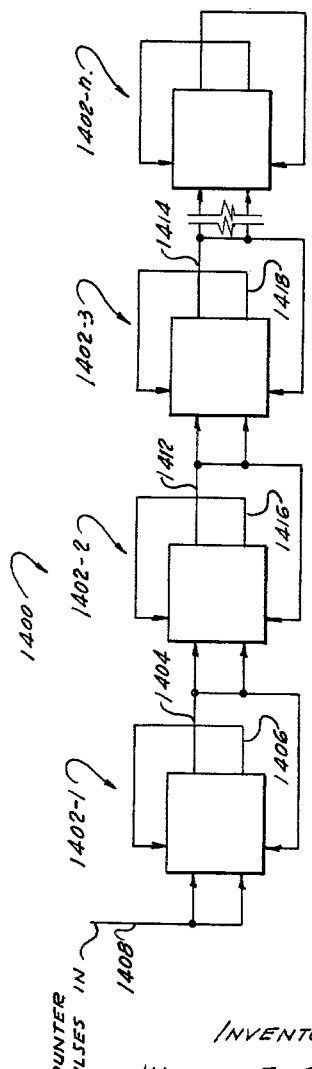
INVENTORS
Warren E. Graybeal
William C. Smith
By A. G. Douvas
Attorney United States Patent Office 3,223,255
Patented Dec. 14, 1965

3,223,255
SEMI-AUTOMATIC CONVEYOR CONTROL SYSTEM
Warren E. Graybeal, 206 W. Elm St., Stillwater, Minn., and William C. Smith, 377 Fairview, Elmhurst, Ill.
Filed Nov. 4, 1960, Ser. No. 67,330
7 Claims. (Cl. 214—11)

This invention relates to an improved electronic control system for automatic and semiautomatic transfer of packages to and from a conveyor.

The preferred embodiment of the present invention has been particularly adapted for use in mail sack sorting systems for use by railways and postoffices and is particularly advantageous in conveyor systems employing horizontal endless belts. However, the invention is to be limited only to the extent set forth in the claims appended hereto.

In a typical mail sack sorting system for use in a railway depot, the sacks are marked with their geographic destinations. For each depot, the United States will be arbitrarily divided into a plurality of major areas each having a main central distribution terminal and a number of nearby areas with branch terminals. For example, for an installation in New York city, Chicago, will be a main terminal for Midwest mail; and all Midwest mail will be directed to Chicago for redistribution. However, each of several cities along the east coast having direct train service with New York city will have its mail routed directly to it rather than to a central terminal. An address or routing code will be assigned to Chicago for all Midwest mail and other codes will be assigned to the east coast cities. The entire country is divided in this manner and each section of the country has an address or routing code.

After the sacks are filled and marked, they must be separated or sorted for loading on trains travelling to the respective terminals. The present invention is primarily directed to this sortation of sacks by code.

Although automatic and semiautomatic conveyor control systems date back as much as forty years, the art is still faced with critical problems especially with regard to flexibility of operation and rapid loading and unloading of the belt.

Continuous maintenance of the apparatus still exists as a serious and costly problem. One of the most notable difficulties in this regard is the operating time which is lost while a fault is being located. In many instances, the repairing or correcting of the fault is a rather simple matter whereas locating the fault is unduly complicated and time consuming.

The distribution of mail sacks is particularly troublesome in these systems because these sacks are awkward to handle and because they vary in overall space utilized and in the configuration which they present depending upon the degree to which they are filled and depending upon, in many instances, the size, weight and number of items which they receive.

This gives rise to mail sack or package positioning problems. Because the belt moves at high speeds in the order of three hundred feet per minute, the slightest mispositioning of a mail sack may cause faulty unloading of the packages from the belt to adjacent discharge chutes. Each transfer mechanism includes a paddle for each direction of package discharging. Each paddle has a surface generally parallel with the direction of movement of the main conveyor belt. This paddle is operated during a very short time interval substantially less than $\frac{1}{10}$ of a second.

Speeds in this order are required since in some instances the spacing between packages will be in the order of five or six inches and the total overall space allotted to a package is five feet. As a result, the transfer mechanism paddle must move in reciprocable fashion across the belt, discharge a package, and return to its normal position again crossing the belt in a time interval less than that required for five inches of belt movement to avoid striking the next succeeding package on the belt.

Due to the unusually high speed of operation of the transfer mechanism, the slightest mispositioning may cause a package to be thrown from the belt at an angle or even jammed against a chute rather than being moved transverse to the direction of belt movement into the chute.

For optimum unloading of a package, the central portion of the paddle must engage the central longitudinal portion of the package. In addition, the package must present a surface generally parallel with the direction of belt movement and therefore parallel to the surface of the paddle. Since the transfer mechanisms may be operated in either direction, it is also necessary that the package be substantially positioned at the transverse center of the belt. The time required for either paddle on either side of the belt to advance to engage the package for removal in either direction should be substantially the same. A substantial difference in these time intervals is in effect the same as longitudinal mispositioning because the package will be in different longitudinal positions at different time intervals.

Thus it can be seen that the package must be positioned as accurately as possible both longitudinally and transversely of the belt.

Accordingly, it is a primary object of the present invention to provide an improved method and means for loading packages on a conveyor.

Another object of the present invention is the provision of improved circuit means for controlling the loading of packages on the conveyor.

A more specific object of the present invention is the provision of a plurality of load stations adjacent the conveyor belt in spaced relation, each having a load mechanism associated therewith as well as a load belt and a storage belt which are controlled automatically or semiautomatically for loading succeeding packages on succeeding portions of the main conveyor belt in a rapid and orderly fashion.

Another object of the present invention is the use of improved means for positioning the packages prior to the operation of the loading mechanisms for assuring accurate longitudinal positioning of the packages on the main conveyor belt and the use of improved means for positioning the packages transversely on the main conveyor belt subsequent to their being loaded.

Another object of the present invention is the provision of monitor circuits which give a rapid visual indication of the proper functioning of the various apparatus in the control system and which visually indicate the presence of a fault therein. In the preferred embodiment, this is accomplished by the selective and orderly energization of neon tubes by various control circuits whereby the neon bulbs indicate the proper or improper functioning of the apparatus by being energized or extinguished.

Another object of the present invention is the provision of an improved binary counter utilized in conjunction with the various control system circuits to indicate the presence or absence of faults in the system.

Another object of the present invention is the provision of improved circuits for controlling the mechanisms which transfer packages from the main conveyor belt.

Another object of the present invention is the provision of improved means for producing routing information in binary code form.

Another object of the present invention is the provision of improved circuit means for entering and transferring coded routing information in the control system.

Another object of the present invention is the provision of an improved distribution plug-decoder means providing greater system flexibility.

Other objects and the various features of the invention will be evident upon a perusal of the following description taken in conjunction with the accompanying drawings in which:

FIG. 4 is a schematic diagram of a portion of the code entry board;

FIGS. 22 and 23 are fragmentary plan and elevation views of another embodiment of the means for transversely centering packages on the main conveyor belt;

FIG. 24 is a plan view of a monitor panel displaying neon tubes, the energized or de-energized conditions of which are observed for determining the location of errors due to malfunction;

FIG. 25 is a diagrammatic representation of an improved counter which forms a part of the present invention; and FIGS. 26 and 27 are diagrams of assistance setting forth the orientation of several of the figures of the present application.

Figure 1:
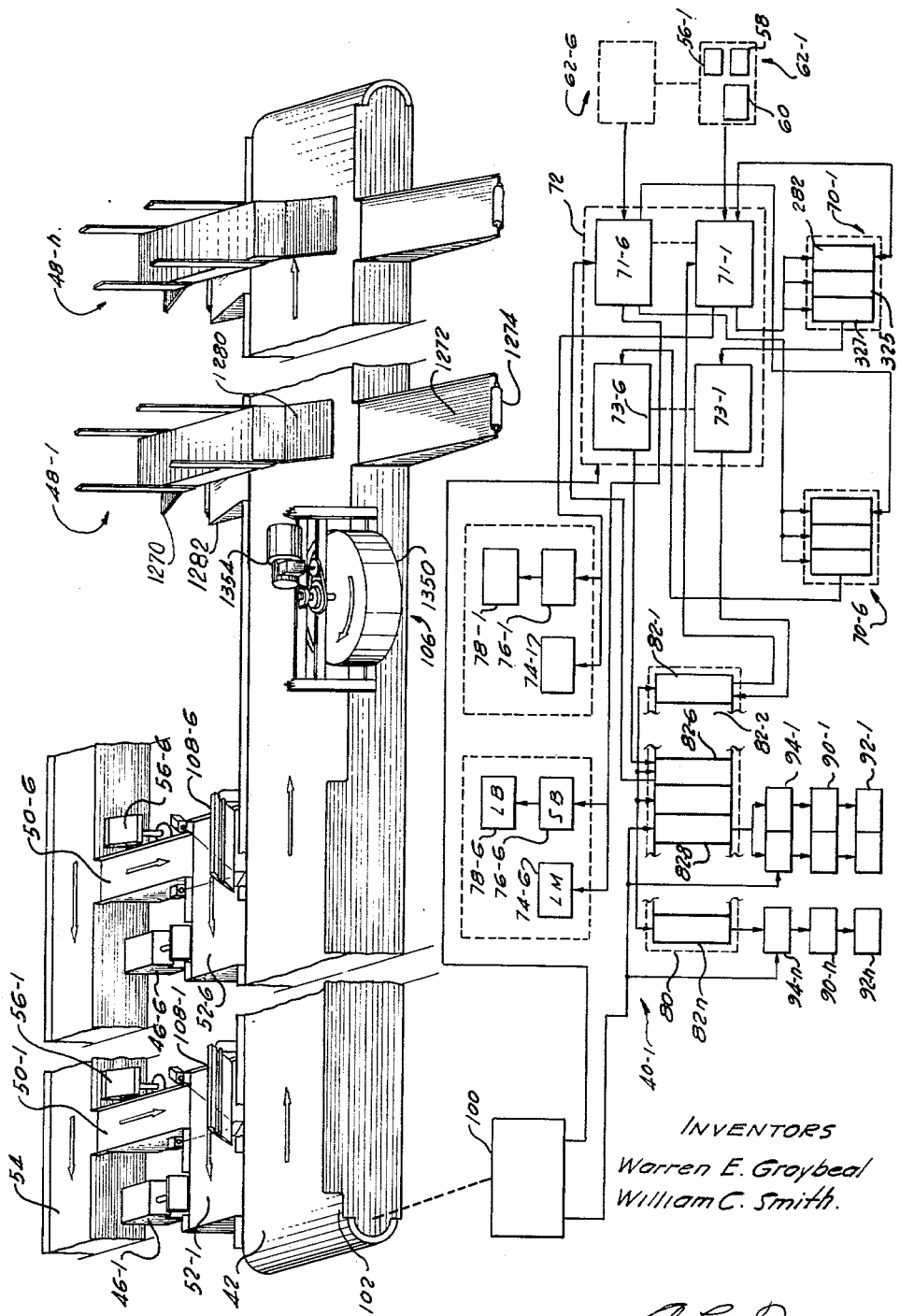
FIG. 1 is a diagrammatic representation of the improved conveyor and conveyor control system.

Briefly, the improved conveyor and control system 40-1 (FIG. 1) comprises an endless main conveyor belt 42 having a loading area in which six load stations having load mechanisms 46-1 to 46-6 are positioned side by side for transferring packages to the belt. A substantially longer unloading area is provided adjacent the belt and is spaced from the loading area in the direction of the belt movement. A plurality of discharge stations having transfer mechanisms 48-1 to 48-n are positioned side by side in the unloading area for transferring packages from the belt in one or two directions as desired.

Storage belts 50-1 to 50-6, associated with the load mechanisms, are loaded with packages by operators. Load belts 52-1 to 52-6, positioned adjacent the storage belts, receive packages from the storage belts and position them before the respective load mechanisms. Packages are supplied to the operators positioned adjacent each of the storage belts by means of an auxiliary feeder belt 54 so that the operators may manually load packages on the storage belt with minimum delay. Each of the operators has access to a respective keyboard mechanism 56-1 to 56-6, each of which mechanisms has a plurality of manually operated switches corresponding to the geographic destinations to which the mail sacks or packages are to be directed. Each keyboard, an associated code board circuit such as 58, and an entry board circuit such as 60 comprise a code forming unit for establishing binary codes corresponding to the geographic destinations of the packages. Code forming units 62-1 to 62-6 are provided for the load mechanisms 46-1 to 46-6.

The load mechanisms and their respective storage and load belts are provided with corresponding buffer memory units 70-1 to 70-6, each having as many stages as there are positions available on the belts for simultaneously storing packages. In the preferred embodiment, two packages may be stored on the storage belt and one on the load belt at all times, and, therefore, three stages are provided in each buffer memory unit. The first buffer stage retains the routing code of a package placed on the storage belt by the operator. The second stage retains the code after the package has been advanced on the storage belt to a second position adjacent the load belt. The third stage retains the code after the package has been transferred to the load belt and positioned in front of the load mechanism in preparation for transfer to the main belt. The code forming units 62-1 to 62-6 cooperate with an input logic circuit 72 for controlling the entry of routing information for the packages into the buffer memory units, through the buffer memory units, and out of the buffer memory units in synchronism with the movement of the packages on the corresponding storage and load belts.

A main memory unit 80 comprising a multistage shift register is provided with one stage such as 82-1 for each five foot section or "zone" along the path of the main belt extending from approximately the first loading mechanism to the last transfer mechanism. The main memory forms an analog of the path along which packages are moved by the main conveyor belt. As the packages move along the conveyor belt path, their routing information, shifted from the buffer memory units to the main memory unit, moves through the main memory in synchronism with the movement of the packages along the path.

Circuits 74-1 to 74-6 are provided for the load mechanisms 46-1 to 46-6. Circuits 76-1 to 76-6 are provided for the storage belts 50-1 to 50-6. Circuits 78-1 to 78-6 are provided for the load belts 52-1 to 52-6. It will be apparent from the following detailed description that the load mechanism circuit 74-1 and the storage belt circuit 76-1 are rendered effective for initiating the operation of the load mechanism 46-1 and the storage belt 50-1 when (1) two packages are held by the storage belt 50-1 and one package by the load belt 52-1, (2) the keyboard 56-1 has been operated to register the routing information of the last package in the buffer memory unit 70-1, and (3) the section of the main conveyor belt 42 passing in front of the load mechanism is empty and therefore ready to receive a package.

Thus the load mechanism circuit and the storage belt circuits are connected to the input logic circuit 72 for control by certain stages of the main memory unit 80, the code forming unit 62-1 and the buffer memory unit 70-1. In the preferred embodiment, it is assumed that the load mechanism 46-1 is in the conveyor path zone corresponding to the shift register stage 82-1; and, therefore, the absence of a routing code in the shift register stage 82–1 will be utilized to indicate that a package may be loaded thereon by the load mechanism 46–1.

The input logic circuit includes input sections 71–1 to 71–6 connected to the respective code forming units 62–1 to 62–6 and connected to the buffer memory units 70–1 to 70–6 for controlling the transfer of routing codes from the code forming units to the respective buffer memory units and for controlling the operation of the load mechanism circuits and the storage belt circuits.

The input logic circuit 72 also includes output sections 73–1 to 73–6 for controlling the transfer of information from the buffer memory units 70–1 to 70–6 to respective stages in the main memory shift register. By way of example, it is assumed that each of the loading mechanisms is spaced from the next a distance in the order of ten feet, and therefore the information from the buffer memory 70–1 to 70–6 will be transferred respectively to the first, third, fifth, seventh, ninth, and eleventh stages of the main memory unit 80. The eleventh stage is identified by the numeral 82–6 in FIG. 1.

Since each of the transfer mechanisms is positioned at a respective location along the conveyor belt path, it will be associated with one of the main memory stages 82–8 to 82–n. However, only one transfer mechanism may be associated with any given main memory stage.

Decoder circuits 90–1 to 90–n are associated with the transfer mechanisms 48–1 to 48–n for detecting routing codes assigned to the transfer mechanisms and for initiating the operation of the transfer mechanisms control circuits 92–1 to 92–n. The decoders are connected to the shift register stages corresponding to their respective transfer mechanisms by means of distribution plugs 94–1 to 94–n. Each routing code corresponds to a geographic destination and these destinations may be assigned as desired to the transfer mechanisms by means of interchangeable male plug-in portions of the distribution plugs 94. When a package which is intended for removal by a selected transfer mechanism arrives in the zone corresponding to the transfer mechanism, its routing code will be received in the main memory stage corresponding to the transfer mechanism for detection by the decoder. Detection of the assigned code will initiate removal of the package from the main conveyor belt by the mechanism. Some of the transfer mechanisms operate in two directions. These require two sections in their decoders for detecting either of two routing codes and two sections in their operating circuits for controlling the direction in which the package is removed.

The timing of the apparatus of the control system is provided by a pulse generator 100. The pulse generator is connected by appropriate means to a shaft (not shown) supporting one of the belt pulleys at one end of the main conveyor belt. As the belt and pulley rotate on the shaft, the pulse generator is rotated at a corresponding speed. The pulse generator includes means for producing ten pulses per second, each pulse preferably having a fifty millisecond duration. Since the belt in a typical installation will be moving at the rate of three hundred feet per minute, there will be ten pulses provided for every five feet of belt movement. Since the belt moves only six inches for each pulse, it will be possible to control the operation of each of the load and unload mechanisms to within plus or minus three inches of belt travel. More precise timing may be afforded by increasing the pulse rate, for example to twenty pulses per second.

A sturdy backstop 102 adjacent one edge of the main conveyor belt 42 aids in the positioning of packages loaded on the belt by the load mechanisms 46–1 to 46–6. A rotating drum package positioning unit 106 is provided above one side of the belt between the last load mechanism 46–6 and the first transfer mechanism 48–1. Each of the load belts 52–1 to 52–6 is provided with a pivoted positioning member 108–1 to 108–6.

The various circuits of the system will now be described in detail, it being assumed that the system comprises six loading stations each having a loading mechanism, a storage belt, and a load belt. It will be further assumed that a seven bit binary code with an eighth bit for parity check is used. That is, for each code there will be provided an even number of "one" bits which will be counted in various code registering portions of the system for the purpose of finding errors in the codes. Each of the codes which normally has an odd number of one bits is provided with an additional one bit in the eighth position. For example, the usual seven bit code for the numeral 1 is 0000001 having an odd number of one bits. Therefore, the code with parity is 10000001 with an even number of one bits. As mentioned earlier, some of the transfer mechanisms are actuated in either of two directions; and, in such an instance, it will be assumed that each direction is a transfer station with its individual assigned routing code.

The pulse generator comprises a suitable electromagnetic device (not shown) for producing pulses at the rate of ten pulses per second. For example, the generator may comprise a permanent magnet mounted on a structure rotated by and in synchronism with the main conveyor belt with ten equally spaced electromagnetic coils positioned along the path of the magnet. As the magnet passes each coil, a signal is produced in the coil. Since the coils are equally spaced, and since the movement of the magnet is at a uniform speed, the pulses produced in the coils will be equally spaced in time. Each of the coils is connected to an input lead, such as lead 150, of a pulse amplifying and shaping circuit, such as circuit 152, FIG. 2.

The circuit 152 comprises a pair of capacitors 154 and 156 which form a high-low filter, an amplifying negator circuit 160, a one-shot multivibrator circuit 162, and a power amplifier 164. The amplifying negator 160 includes a transistor 170, the base of which is connected to the signal input lead 150. The collector of the transistor 170 is connected to the base of a transistor 172 in the multivibrator by way of a diode 174 and a capacitor 176. The diode 174 provides a back bias which substantially eliminates noise at junction A.

Each time a signal is applied to the lead 150, the amplifier negator 160 applies a positive pulse to the base of the transistor 172. Transistor 172 is normally conducting, and transistor 180 is normally in its non-conducting state. The positive pulse on the base transistor 172 cuts off the transistor 172 and causes transistor 180 to conduct. When the transistor 172 is cut off, it charges an integrating circuit 182 which is provided for substantially eliminating spikes in the pulses passed. Shortly after the termination of the positive pulse applied to the base of the transistor 172, the multivibrator restores itself to its normal condition in a well known manner.

Each time that the multivibrator cycles, it produces a pulse at its output 184 which pulse is amplified by a transistor 186 of the power amplifier 164. Each pulse amplified by the transistor 186 energizes a relay coil 190 in its output circuit and momentarily energizes a neon bulb 192. Each time that the relay coil 190 is energized, it opens its contacts 194 to lower the potential on its output conductor S1 from ground potential to a negative 64 volt potential. The pulse is preferably of fifty millisecond duration.

There will be ten circuits, such as 152, each of which has its input lead, such as 150, connected to a respective one of the coils in the electromagnetic time pulse generator, and each having an output lead, such as S1. The output leads of the ten circuits will be identified respectively as S0 through S9. The characters S0 through S9 indicate the position in which the conductors are energized by pulses produced, amplified and shaped in the generator 100. The S0 conductor is the first in the sequence to be energized, it corresponds to the first six inches in each five foot conveyor zone, and it serves to apply the shift pulse to the shift register stages of the main memory 80 to advance the routing codes one stage as the corresponding packages enter the first six inches of the next zone.

Figure 3:
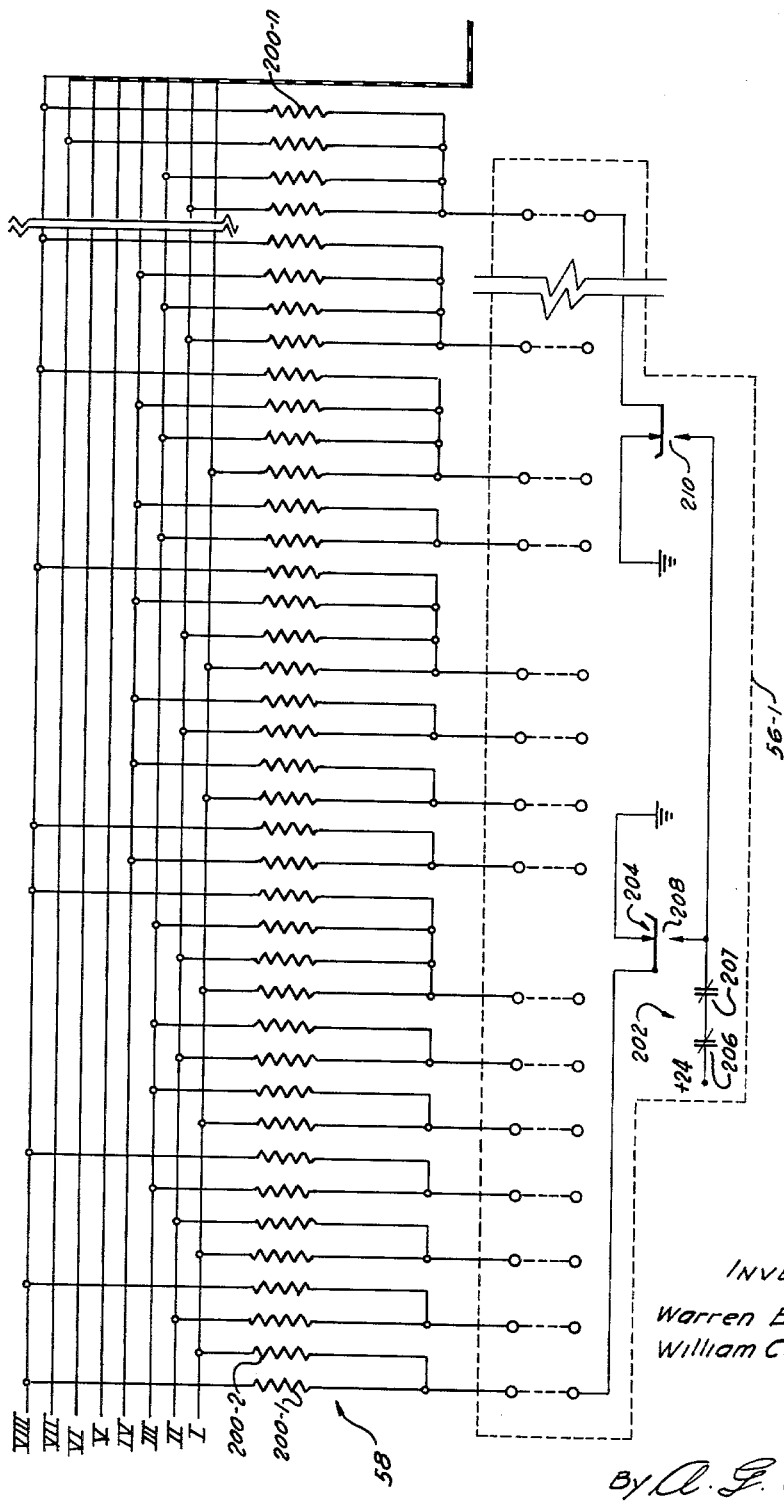
FIG. 3 is a schematic diagram of certain of the keyboard switches and the code board.

FIG. 3 shows a portion of the keyboard 56–1 and its coding board 58 which includes eight normally grounded bus bars numbered I–VIII respectively. The connections from the key actuated switches of the keyboard 56–1 to the bus bars are made by way of resistors 200–1, 200–n. A switch 202 actuated by the No. 1 key on the keyboard 56–1 is connected to the bus bars I and VIII by way of resistors 200–1 and 200–2.

In the restored condition of the switch 202, ground is connected by way of contacts 204 to the bus bars I and VIII. When the switch 202 is actuated, ground is removed from these bus bars and a positive 24 volt potential is connected thereto by way of contacts 206, 207 and 208.

As will be described in more detail later, the contacts 206 and 207 are normally closed, but are opened when the storage and load belts 50–1 and 52–1 are moving, thereby to prevent the entry of a new routing code except when the system is conditioned for receiving the new code. This will prevent entering of a code due to an operator accidentally actuating or bumping one or more of the keys on the keyboard. It will be noted that the usual binary code for the numeral 1 is formed by applying a positive potential to the bus bar I and ground potential to bus bars II to VII. A second or additional one bit is added by applying a positive potential to the bus bar VIII, whereby an even number of one bits is provided for parity check.

Similarly, the switch 210, when actuated, applies a positive 24 volt potential to the bus bars II, III, VII and VIII to form the code 01100011 corresponding to the decimal 70. The remaining switches (not shown) similarly apply positive potentials to selected bus bars to form other codes.

The bus bars I to VIII are connected respectively to the input leads 250–1 to 250–8 respectively of the keyboard entry circuit 60 (FIG. 4). The circuit 60 comprises eight transistor amplifier circuits 252–1 to 252–8. The input leads 250–1 to 250–8 are connected respectively to the emitters of transistors 254–1 to 254–8. The base of each transistor is grounded, and the collectors are connected to a negative 96 volt potential by way of load resistors 256–1 to 256–8. The collectors of each of the transistors are also connected to output leads 260–1 to 260–8 by means of diodes 262–1 to 262–8.

The transistors 254–1 to 254–8 are normally nonconducting by reason of both the base and the emitter having ground potential applied thereto, the emitters being grounded by way of the normally grounded bus bars. Whenever a key is depressed which applies the positive 24 volt potential to selected bus bars, the transistors 254 connected to the selected bus bars will begin to conduct. The collector potential of the conducting transistors will fall from approximately a negative 64 volt potential to ground potential. As soon as the key is released, the energized transistors will be cut off.

While each of the transistors is conducting, their respective neon tubes 266–1 to 266–8 will be de-energized to indicate the particular bits of information being registered in the system in response to the depression of a key. When the transistor is cut off, its respective neon tube will again be energized.

Thus, upon actuation of each of the switches, such as 202 or 210, an even number of the conductors 260–1 to 260–8 will be selectively energized by the potential thereon rising from a negative 64 volt potential to ground potential.

Attention is directed to the improved resistor matrix-grounded base transistor configuration which presents an unusually economical and reliable code forming circuit as compared with comparable prior art devices. In one commercial embodiment, the improved matrix of circuit 58 and the transistor amplifier configuration of circuit 60 will comprise in the order of 256 inexpensive resistors and 8 transistor circuits in lieu of a 256 diode-resistor matrix driving a somewhat different eight-stage transistor circuit.

The conductors 260–1 to 260–8 are connected respectively to the inputs to the eight sections 280–1 to 280–8 (FIG. 6) of the first stage 282 of the buffer memory unit 70–1 by way of diodes 284–1 to 284–8 (FIG. 5) and conductors 286–1 to 286–8. The conductors 286–1 to 286–8 are connected respectively to the collectors of transistors 288–1 to 288–8 of the sections 280–1 to 280–8. These transistors form the 0 sides of flip-flop circuits 290–1 to 290–8. Transistors 292–1 to 292–8 form the 1 sides of the flip-flop circuits. Each transistor 292 is normally conducting when a 0 bit is stored in its section, and each transistor 288 is conducting when a 1 is stored in its section. Thus a 0 bit in each section is characterized by a negative 64 volt potential at the collector of transistor 288 and a 1 bit by a negative 64 volt potential at the collector of transistor 292.

The base of each transistor in the flip-flop circuit 290–1 is coupled to the collector of the other transistor by means of cross coupling resistors 294 and 296. The bases are connected to a positive 24 volt biasing potential by means of resistors 298 and 300. The collectors are connected to a negative 96 volt potential by way of resistors 301 and 302. The collectors are also connected to the zero and one output conductors 286–1 and 303–1. A pair of neon tubes 304–1 and 305–1 are connected between the collectors and the negative 96 volt potential whereby the neon tube 304–1 is energized when a zero is entered in the section 280–1 and the neon tube 305–1 is energized when a one is entered in the section.

A pair of "and" input circuits 306–1 and 307–1 are connected to the bases of the transistors 288–1 and 292–1 respectively. The circuit 306–1 comprises a voltage divider network including a resistor 308–1, a capacitor 309–1, a resistor 310–1 and the resistor 300 which are connected between a negative 96 volt potential and the positive 24 volt biasing potential for the transistor 288–1. The circuit 306–1 also comprises a pair of diodes 311–1 and 312–1, a shift pulse conductor 313–1, and an input conductor 314–1. A negative 64 volt potential is connected to the input conductor 314–1 and ground potential is normally applied to the conductor 313–1 by way of an input logic circuit which will be described in detail later.

So long as ground potential is applied to the conductor 313–1, the junction 315–1 is maintained at ground potential. However, if ground potential is removed from the conductor 313–1, the negative 64 volt potential appearing at the conductor 314–1 is extended to the junction 315–1 to charge the capacitor 309–1. If ground potential is subsequently reapplied to the conductor 313–1, the ground potential is extended to the capacitor 309–1 whereby a 64 volt potential appears across the capacitor with the right plate of the capacitor being positively charged with respect to the left plate. This positive potential is applied to the base of the transistor 288–1 to cut off the transistor if it is conducting at the moment. Since non-conduction of the transistor 288–1 is representative of the zero state of the section 280–1, the momentary removal of ground potential from the conductor 313–1 will cause the section 280–1 to be reset to its zero state if it has been changed to a one state previously by actuation of one of the switches in the keyboard 56–1.

Since ones are transferred to the stage 280–1 by way of the zero output lead 286–1, as described above, the one input lead 316–1 is permanently grounded. This prevents the transistor 292–1 from being cut off when the ground potential is disconnected from the common input conductor 313–1.

Each of the other sections 280–2 to 280–8 is similar to section 280–1 and is similarly reset to its zero condition. Thus the eighth bit section 280–8 includes a flip-flop circuit 290-8, a pair of and input circuits 306-8 and 307-8, a common input shift pulse conductor 313-8 and individual input conductors 314-8 and 316-8 for the zero and one sides of the section. Conductor 316-8 is connected to ground potential and the conductor 314-8 is connected to a negative 64 volt potential.

The sections 280-1 to 280-8 include and circuits 317-1 to 317-8. The function of these and circuits is to count the number of one bits in each code stored therein to determine whether or not a correct code, indicated by an even number of one bits, has been entered. In the event that the number of ones in the code is an odd number, an alarm will be given. The circuits whereby this function is achieved will be described later with respect to the main memory unit 80 which has similar parity check circuits.

The collectors of the transistors 288-1 to 288-8 are connected to an additional and circuit comprising diodes 320-1 to 320-8, a resistor 321 and a neon tube 322. When zeros are stored in all of the sections 280-1 to 280-8, the negative 64 volt potential at the collectors will be extended to the junction between the diodes 320 and the resistor 321 to deenergize the neon tube 322. Thus the presence of all zeros, that is, no routing code, is indicated by extinguishing of the neon tube 322. Under all other conditions where a routing code is stored in the stage 282, two or more of the collectors will be at ground potential, that is, a one will be stored in their sections; and the ground potential will be extended to the junction between the diodes 320 and the neon tube 322 to cause energization of the neon tube 322.

A similar circuit extending from the collectors of the transistors 292-1 to 292-8 causes deenergization of a neon tube 323 whenever all ones are stored in each of the sections 280-1 to 280-8. This will occur only if the test procedures, which will be described later with respect to the main memory stage 82-1, are utilized to check the entry of ones into the buffer memory 70-1.

It will be recalled that each stage of the buffer memory unit 70-1 includes an eight-section shift register stage. Each section of the stage 282 is therefore connected to a corresponding section of the next succeeding stage in the buffer memory unit. Thus the zero output conductor 286-1 of section 280-1 is connected to the zero input conductor, similar to conductor 314-1, of the corresponding section (not shown) of the next succeeding second stage 325 (FIG. 1). Similarly, the one output conductor 303-1 is connected to the one input conductor similar to conductor 316-1 of the corresponding section of the next succeeding stage.

Figure 10:
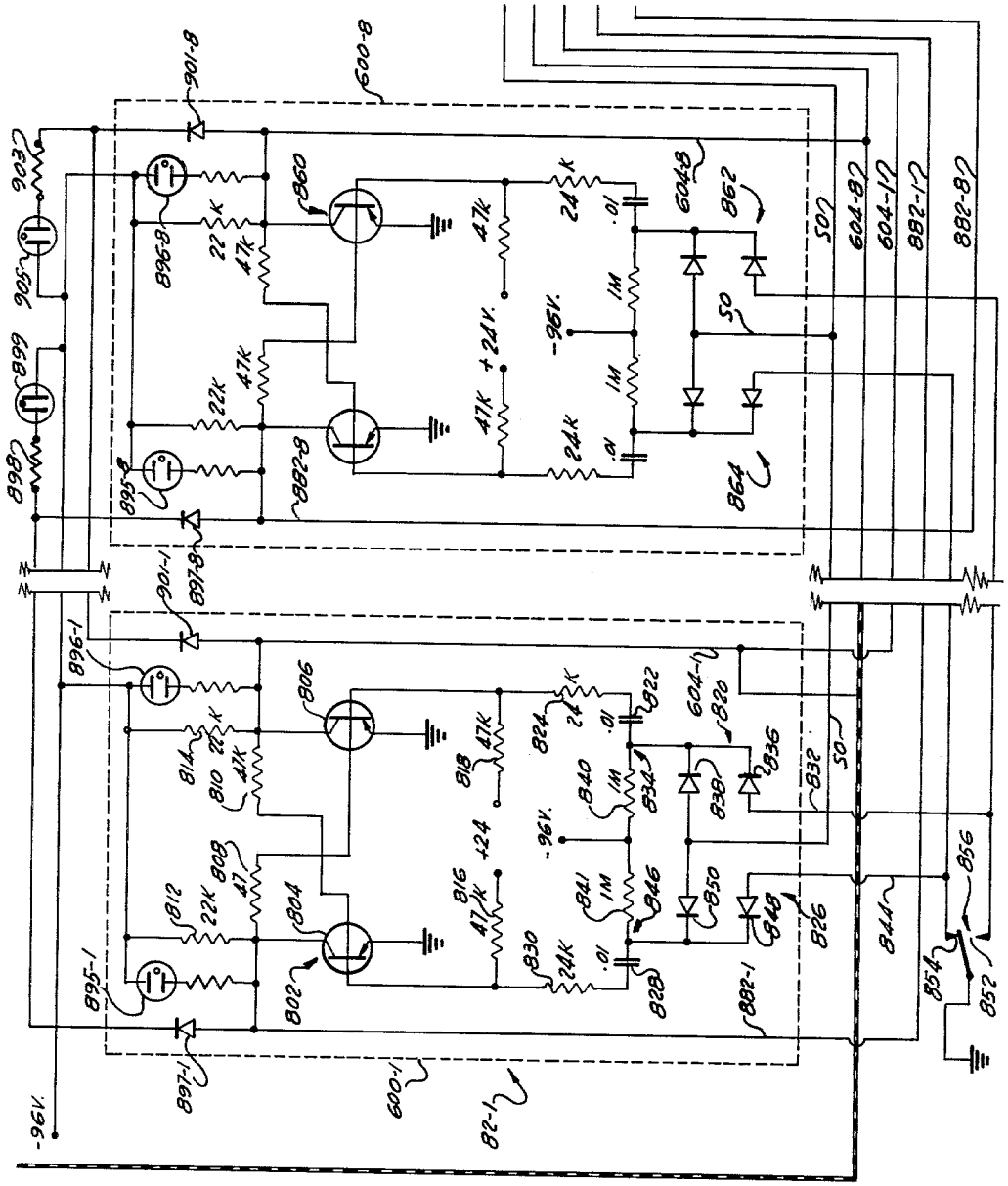
FIGS. 10 and 11 are schematic diagrams of portions of the first and second stages of the main memory unit.
Figure 11:
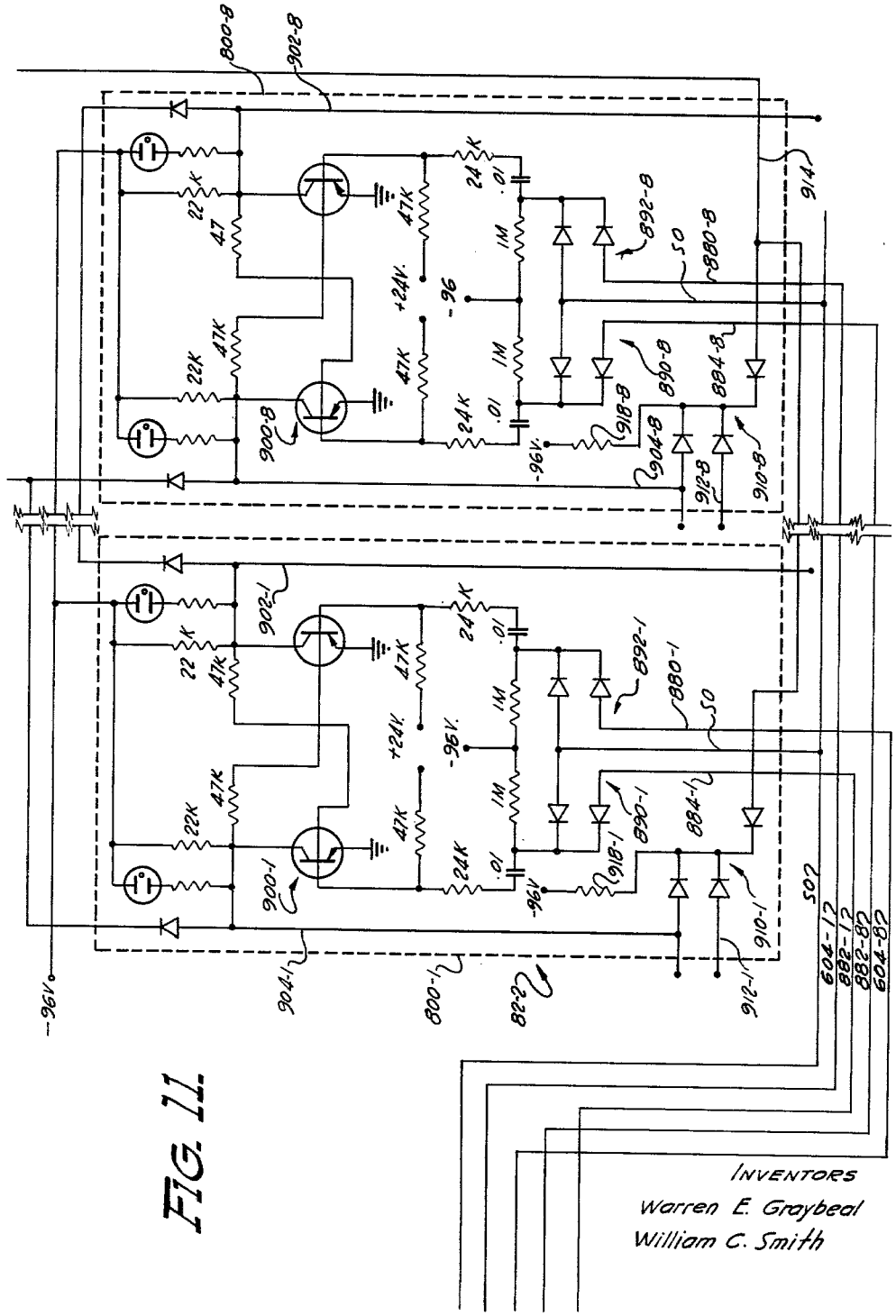

The manner of making these connections and a more detailed description of the manner in which the circuits cooperate for transfer of routing codes will be made with respect to FIGS. 10 and 11 which show similar succeeding shift register stages of the main memory unit 80. Briefly, the output conductors 286-1 and 303-1 are connected at all times to the respective inputs to the corresponding section next succeeding stage. Thus the collector potentials on the transistors 288-1 and 292-1 are at all times applied to the inputs to the next succeeding section. A negative 64 volt shift pulse of 50 millisecond duration is applied to each of the common shift pulse conductors, such as 313-1, of the eight sections of each of the three buffer memory stages. The output lead 286-1 or 303-1 to the next section which has a negative 64 volt potential applied thereto will open the gate of the next section corresponding to gate 306-1 or 307-1 to cause the cut off of the corresponding flip-flop transistor. This in effect causes the transfer of the zero or one bit in the section 280-1 to the corresponding section in the next succeeding stage.

Similarly, the bits stored in each of the other sections 280-2 to 280-8 are transferred to corresponding sections in the next succeeding stage when the buffer memory shift pulse is applied to the conductors such as 313-1 to 313-8 in all stages. The sections 280-2 to 280-8 having ones stored therein will open the one and gates such as 307-1 in the succeeding stage sections to set the sections in their one states; and the sections having zeros stored therein will open the zero and gates such as 306-1 in the succeeding sections to set the sections in their zero states. The code stored in the second stage 325 (FIG. 1) of the buffer memory unit 70-1 will be transferred in a similar manner to the third stage 327.

Figure 9:
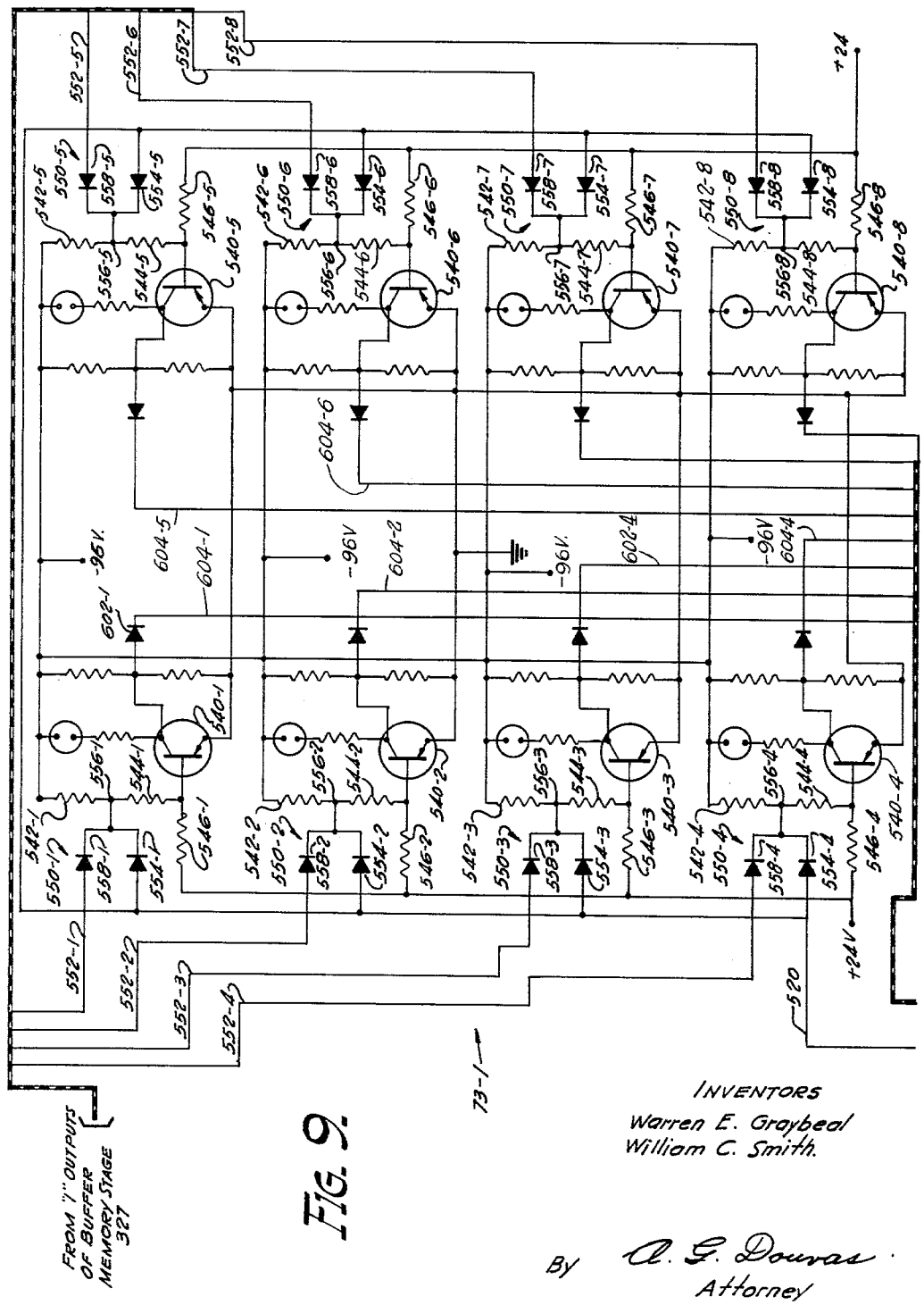
FIG. 9 is a schematic diagram of a portion of the input logic board for transferring codes from a buffer memory unit to the main memory unit.

The input and output sections 71-1 (FIG. 5) and 73-1 (FIG. 9) of the input logic circuit 72 will now be described in detail. The input section 71-1 is shown in detail in FIG. 5. It comprises a four-section and circuit 350 including an output junction 372, a resistor 391 connected to a negative 96 volt potential, and a capacitor 400 and resistor 404 connected in the base circuit of a transistor 402.

The first section of the and circuit 350 comprises the eight conductors 286-1 to 286-8 extending from the zero sides of the sections 280-1 to 280-8 of the first stage of the buffer memory 70-1. These eight conductors are anded together by means of diodes 352-1 to 352-8 and resistors 354, 356 and 358 which are connected between a negative 96 volt potential and a positive 24 volt potential. The junction between the resistors 356 and 358 is connected to the base of a transistor 360.

When no code is registered in the first buffer memory stage, each of the conductors 286-1 to 286-8 will have a negative 64 volt potential applied thereto which will bias the base of the transistor 360 to approximately minus 24 volts to cause conduction by the transistor. However, whenever a code exists in the first stage of the buffer memory, ground potential will appear on two or more of the conductors 286-1 to 286-8 to cause a positive 12 volt bias potential to be applied to the base of the transistor 360 to cut off the transistor. When the transistor is nonconducting, a negative 64 volt potential will appear at its collector, and when it is conducting, a zero ground potential will appear at its collector. The collector of the transistor 360 forms one input to the and circuit 350.

The conductors 260-1 to 260-8 are anded together by means of diodes 370-1 to 370-8. When none of the keys in the keyboard are depressed, a negative 64 volt potential appears at the output junction 372 assuming that all other inputs to the and circuit 350 are also at a negative 64 volt potential. When one of the keys is depressed, ground potential will appear on two or more of the conductors 260-1 to 260-8, and this ground potential will be extended to the junction 372 of the and circuit 350. Thus the conductors 260 and diodes 370 form the second input to the and circuit 350.

Conductors 380-1 to 380-8 are anded together by means of diodes 382-1 to 382-8. The conductors 380-1 to 380-8 are connected to the zero output sides of the eight sections of the first stage 82-1 of the main memory 80. These connections will be set forth in more detail during the detailed description of the main memory unit 80.

When there is no code in the stage 82-1, indicative of the fact that there is no package on that portion of the belt corresponding to the stage 82-1 at a particular instant, the zero sides of the shift register sections will be in their zero condition whereby a negative 64 volt potential is applied to each of the conductors 380-1 to 380-8. This negative potential will appear at the junction 372, assuming that all other inputs to the and circuit 350 are also at a negative 64 volt potential. Thus these conductors 380-1 to 380-8 form a third input to the and circuit 350.

The fourth and final input to the and circuit 350 is provided by the conductor 390. This conductor 390 is connected to one of the pulse generator output conductors S1 to S10 depending upon the particular physical location of the load mechanism 46-1 in relation to the main belt zone in which it is located. For example, assuming that the center of the paddle of the transfer mechanism 46-1 is aligned with the center of the zone in which it is positioned, then the paddle should be operated to push a package on the belt when the S5 conductor has a pulse applied thereto. For reasons which will be apparent from the following description, the conductor 390 will then be connected to the S4 conductor.

If the system is in condition for the transfer of a package by the load mechanism 46–1 from the load belt 52–1 to the main conveyor belt 42, the first stage 282 of the buffer memory 70–1 will have caused the collector of the transistor 360 to drop from zero to a negative 64 volt potential indicating the entry of a code therein corresponding to a newly loaded package on the storage belt. The keyboard entry circuit will have caused a negative 64 volt potential to be applied to the conductors 260–1 to 260–8 indicating the restoration of the code forming unit 62–1 to normal. The main shift register section 82–1 will have applied a negative 64 volt potential to its conductors 380–1 to 380–8 indicating the empty condition of the corresponding section of the belt.

The next pulse which is then applied to the conductor S4 for 50 milliseconds will be extended to the conductor 390 to cause the junction 372 to drop from zero ground potential to which it has been held by the conductor 390 to a negative 64 volt potential. This negative potential will be applied to a capacitor 400 which, at the duration of the fifty millisecond pulse, will be charged such that a positive 64 volt potential appears at its terminal which is connected to the base of a transistor 402 by way of a resistor 404.

The transistor 402 together with a transistor 406 forms a master control flip-flop circuit 410. The collectors of the transistors 402 and 406 are coupled to the bases of the opposite transistors by means of cross coupling resistors 412 and 414. The bases of the transistors are connected to a positive 24 volt biasing potential by way of biasing resistors 416 and 418. The collectors of the transistors 402 and 406 are connected to a negative 96 volt potential by means of resistors 420 and 422. A pair of indicating neon tubes 424 and 426 are connected between the collectors of the transistors and the negative 96 volt potential to indicate the conducting and nonconducting states of the transistors.

The transistor 402 is normally conducting so that zero ground potential appears at its collector. This ground potential is connected by way of an output lead 430 to the inputs of a plurality of and circuits 432, 434, 436 and 438. When a pulse from the and circuit 350 causes a high positive potential to be applied to the base of the transistor 402 as described above, the transistor 402 will be cut off, and a negative 64 volt potential will appear at its collector and therefore at the inputs to the and circuits 432 to 438 inclusive.

A conductor 450, which is connected to the S5 conductor (assuming that the conductor 390 is connected to the S4 conductor), is connected to the other inputs to the and circuits 432, 434 and 436. The flip-flop circuit 410 having been set to its one condition applying a negative 64 volt potential to the inputs to the and circuits 432, 434 and 436, the and circuits will then be opened upon application of a negative 64 volt potential to the conductor 450 one-tenth of a second later. This will cause a negative 64 volt potential to appear at the junctions 452, 454 and 456 of the and circuits. This negative potential will cause transistors 460, 462 and 464, which are normally cut off by a positive bias potential, to begin conducting. Since the length of the pulse applied to the conductor 450 is in the order of fifty milliseconds, the transistors will conduct for approximately fifty milliseconds and then will be cut off by reason of the junctions 452, 454 and 456 being raised to zero ground potential by ground on the conductor 450. When the transistors 460, 462 and 464 conduct, they will energize the coils 470, 472 and 474 which are connected in the collector circuits.

A conductor 451, which is connected to the S6 conductor (assuming that the conductors 390 and 450 are connected to the S4 and S5 conductors), is connected to the other input to the and circuit 438. Thus a negative 64 volt potential will be applied to the junction 458 of the and circuit 438 one-tenth of a second after the transistors 460, 462 and 464 begin to conduct. This negative 64 volt potential at the junction 458 will cause the transistor 466 to conduct for 50 milliseconds, the duration of the pulse applied to the conductor 451. When the transistor 466 conducts, it energizes the relay 476 in its collector circuit.

The conductor 451 is also connected to the base of the transistor 406 by way of a diode 475, a capacitor 477 and a resistor 479. The capacitor 477 is charged; and, at the end of the pulse on conductor 451, it is characterized by a positive 64 volt potential on its right plate. This potential cuts off the transistor 406 and causes the transistor 402 to conduct, thereby resetting the flip-flop 410.

Neon tubes 480, 482, 484 and 486 are connected in the collector circuits to indicate the conducting or nonconducting state of the transistors 460, 462, 464 and 466. Collector load resistors 490, 492, 494 and 496 are connected in series with the coils 470, 472, 474 and 476 in the collector circuits of the transistors.

Suppressor diodes 500, 502, 504 and 506 are connected across the coils 470, 472, 474 and 476 to protect the transistors from high back voltages which would otherwise be produced by the coils 470, 472, 474 and 476 when current ceases to flow therethrough.

Energization of the coils 470, 472, 474 and 476 respectively causes opening of the contacts 510, closing of the contacts 512 and 514, and opening of the contacts 516. When the contacts 510 are opened, ground potential is removed from the conductor 520. This permits transfer of the routing information or code in the last stage 327 of the buffer memory unit 70–1 to be transferred to the first stage 82–1 of the main memory unit by way of the output section 73–1 of the input logic circuit 72.

When the contacts 512 are closed, a 110 volt alternating current potential is applied to the conductor 522 to initiate operation of the storage belt 50–1. When the contacts 514 are closed, a 110 volt alternating current potential is applied to the conductor 524 to initiate the operation of the loading mechanism 46–1.

When the contacts 516 are subsequently opened one-tenth of a second later, ground potential is removed from the conductor 526. Conductor 526 is connected to the common shift pulse conductors, such as 313–1, of each section of the three buffer memory stages 282, 325 and 327. Removal of ground potential from the shift pulse conductors resets the first buffer memory stage 282 as described above and causes the routing information or codes in the first and second stages of the buffer memory unit 70–1 to be transferred to the second and third stages respectively. The circuits for performing functions will now be described.

The output section 73–1 (FIG. 9) of the input logic circuit 72 comprises a plurality of transistors 540–1 to 540–8. A network comprising resistors 542–1 to 542–8, 544–1 to 544–8, and 546–1 to 546–8 are connected between a negative 96 volt potential and a positive 24 volt potential. This network normally applies a positive cutoff potential to the bases of the transistors 540–1 to 540–8.

The resistor networks also form a part of a plurality of and circuits 550–1 to 550–8. These and circuits include input conductors 552–1 to 552–8 connected respectively to the outputs of the 1 sides of the flip-flop sections in the third stage 327 of the buffer memory shift register 70–1. Each of the eight bits of information in the routing code stored in the third stage of the buffer memory will cause a negative 64 volt potential to appear on its conductor 552 if it is a 1 and a ground potential if it is a zero. The and circuits 550 are held open by reason of ground potential being applied to their other inputs by way of contacts 510 (FIG. 5), conductor 520, and diodes 554–1 to 554–8. When ground potential is removed from the conductor 520 upon energization of the coil 470, as described above, the negative 64 volt potential appearing on leads 552–1 to 552–8 will be applied to the junctions 556–1, 556–8 by way of diodes 558–1 to 558–8. Those junctions which have the negative 64 volt potential applied thereto by reason of the corresponding bit in the routing code being a 1 cause a negative potential to be applied to the bases of their corresponding transistors 540–1 to 540–8 to cause the latter to conduct.

Those transistors which conduct cause their collector potential to fall from a negative 64 volt potential to ground potential. This ground potential is extended to the zero outputs of the eight sections 600–1 to 600–8 of the first stage 82–1 of the main memory shift register 80 by way of diodes 602–1 to 602–8 and conductors 604–1 to 604–8. This transfers the routing code from the buffer memory 70–1 to the main memory 80. The operation of the main memory to record the code will be described later.

Figure 7:
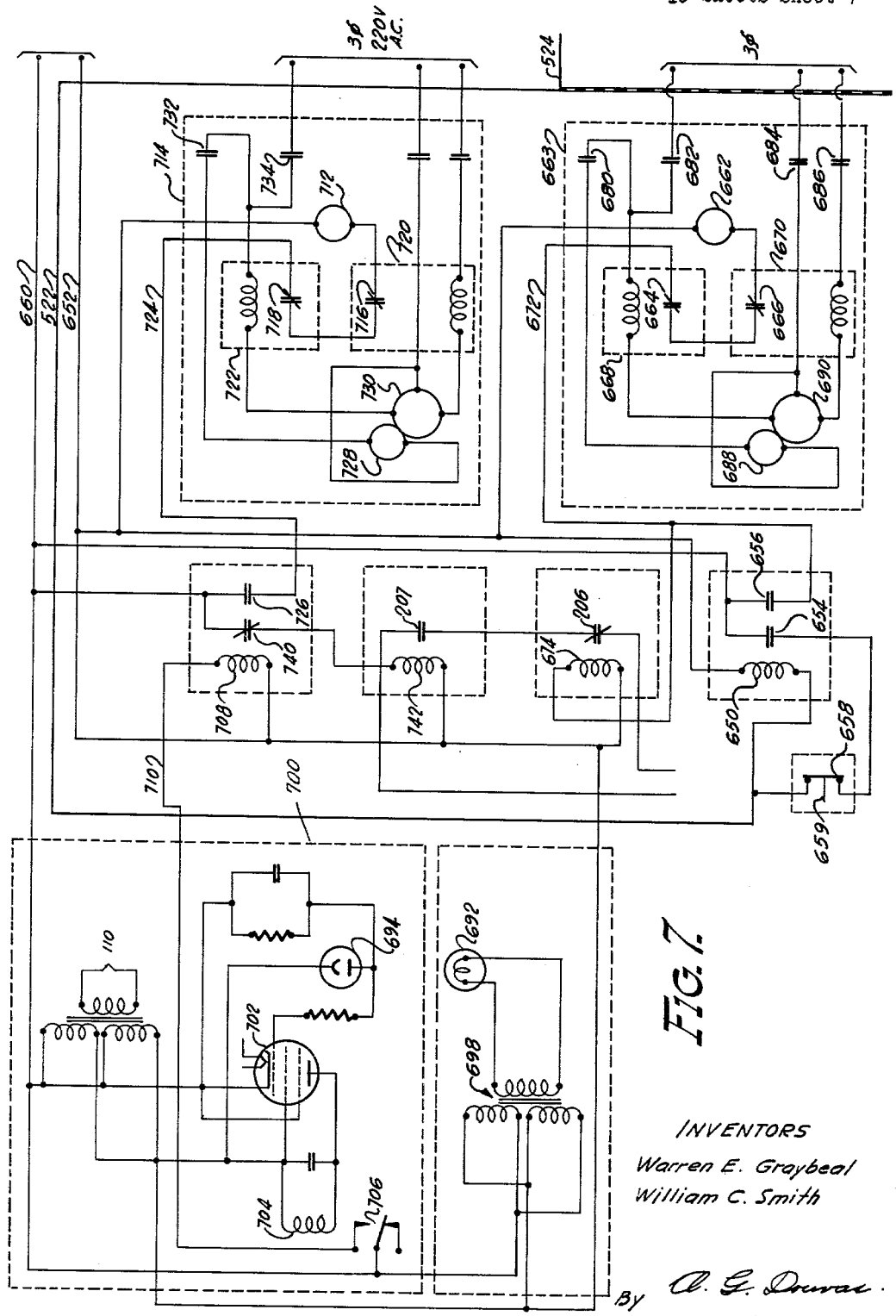
FIGS. 7 and 8 are schematic diagrams of the operating circuits for the load mechanism, the storage belt and the load belt at one load station.

As indicated above, the contacts 512 of the coil 472 control the initiation of the storage belt operation. Closure of contacts 512 applies one terminal of a 110 volt alternating current source to the conductor 522 to energize a lockup relay coil 650 (FIG. 7) which is connected to the other terminal of the source by conductor 652.

The relay coil 650 operates a pair of contacts 654 and 656. The contacts 654 and a limit switch 658 maintain the relay 650 energized after the contacts 512 are opened shortly after their closure. The circuit for maintaining the relay 650 energized extends from one terminal of the 110 volt alternating current source, over conductor 660, through the contacts 654 and limit switch 658, the winding of the relay 650 and conductor 652 to the other terminal of the source.

The contacts 656 complete a circuit for energizing a motor start relay or coil 662 of a storage belt motor start circuit 663 over a circuit including conductor 652, the winding of the relay 662, normally closed contacts 664 and 666 of overload relays 668 and 670, conductor 672, contacts 656 and conductor 660. The contacts 656 also complete a circuit including the conductor 660, contacts 656, conductor 672, relay 674, and the conductor 652 for energizing the relay 674. The relay 674 opens the normally closed contacts 206 which, as indicated above with respect to the description of the keyboard entry station, prevents the application of a positive 24 volt potential to the resistor matrix of the circuit 58 while the transfer belt is in operation.

The motor start coil 662 closes four sets of contacts 680, 682, 684, and 686 when it is energized. The contacts 680 complete an obvious circuit energizing an electrical brake 688 to release a motor 690. Contacts 682, 684 and 686 energize the motor 690 of the storage belt over an obvious circuit including a conventional three phase source of power and the coils of overload switches 668 and 670. The motor 690 and the brake 688 may be any suitable, commercially available device for operating the storage belt upon energization of the brake and motor.

The belt is moved in a conventional manner by the motor 690 to advance the last loaded package to a position adjacent the load belt and to transfer to the load belt the package previously moved adjacent thereto. When the storage belt has moved a predetermined distance which properly advances the two packages thereon, the limit switch 658 is actuated to release the lockup relay 650. The limit switch 658 may be any suitable device which is actuated periodically, for example, by means of fingers (not shown) carried by the belt at equally spaced positions for periodic engagement with an actuating arm 659 of the switch 658. The relay 650 restores the coil 662 to apply the brake 688 and stop the motor 690 and to restore the relay 674.

When a package is transferred from the storage belt to the load belt, the package interrupts the light beam extending from a lamp 692 (FIGS. 7 and 17) to a photocell 694 by way of a reflecting mirror 696. The lamp 692 is suitably energized by way of the conductors 660 and 652 and a transformer 698. The photocell 694 is connected in an amplifier circuit 700. The circuit 700 includes a pentode 702 which is normally maintained below cutoff by the photocell 694 so long as light from the lamp 692 falls upon the photocell. However, when the light beam is broken by a package, the photocell permits the pentode 702 to conduct, energizing the relay 704 in its plate circuit.

Energization of the relay 704 closes contacts 706 to energize a coil 708. This circuit includes conductor 660, contacts 706, conductor 710, the coil 708, and conductor 652.

The coil 708 closes contacts 726 to energize a load belt motor start coil 712 of a motor start circuit 714 over a circuit including conductor 652, the coil 712, the normally closed contacts 716 and 718 of overload relays 720 and 722, conductor 724, contacts 726, and conductor 660. The load belt motor start circuit 714 is generally similar to the storage belt motor start circuit 663 and includes an electrically energized brake 728 and a motor 730. The relay 712 closes contacts 732 to energize the brake and contacts 734, 736, and 738 to energize the motor.

The relay 708 also opens normally closed contacts 740 to restore a normally energized relay 742. The relay 742 controls normally closed contacts 207 in the keyboard switch circuits to prevent energization of the resistor matrix in the circuit 58 by an accidentally actuated key while the load belt is being moved.

The relay 704 is maintained energized so long as the package transferred to the load belt interrupts the light beam to the photo cell 694. As soon as the package is moved by the load belt beyond the path of the light beam, the relay 704 is restored. However, the relay is a suitable fast to operate but slow to release relay; and the load belt motor will be maintained energized to continue moving the load belt for a short predetermined time interval after the trailing edge of the package passes the path of the light beam. This arrangement will cause the package on the load belt to stop so that the trailing edge of the package will be a predetermined distance from the line defined between light beam and photocell and hence from the load mechanism. When the package is transferred from the load belt to the main conveyor belt, this trailing edge of the package will become the leading edge of the package on the main belt. Thus accurate alignment of the package on the main belt is assured by reason of its accurate positioning on the load belt and by reason of the accurate initiation of the operation of the load mechanism.

Figure 8:
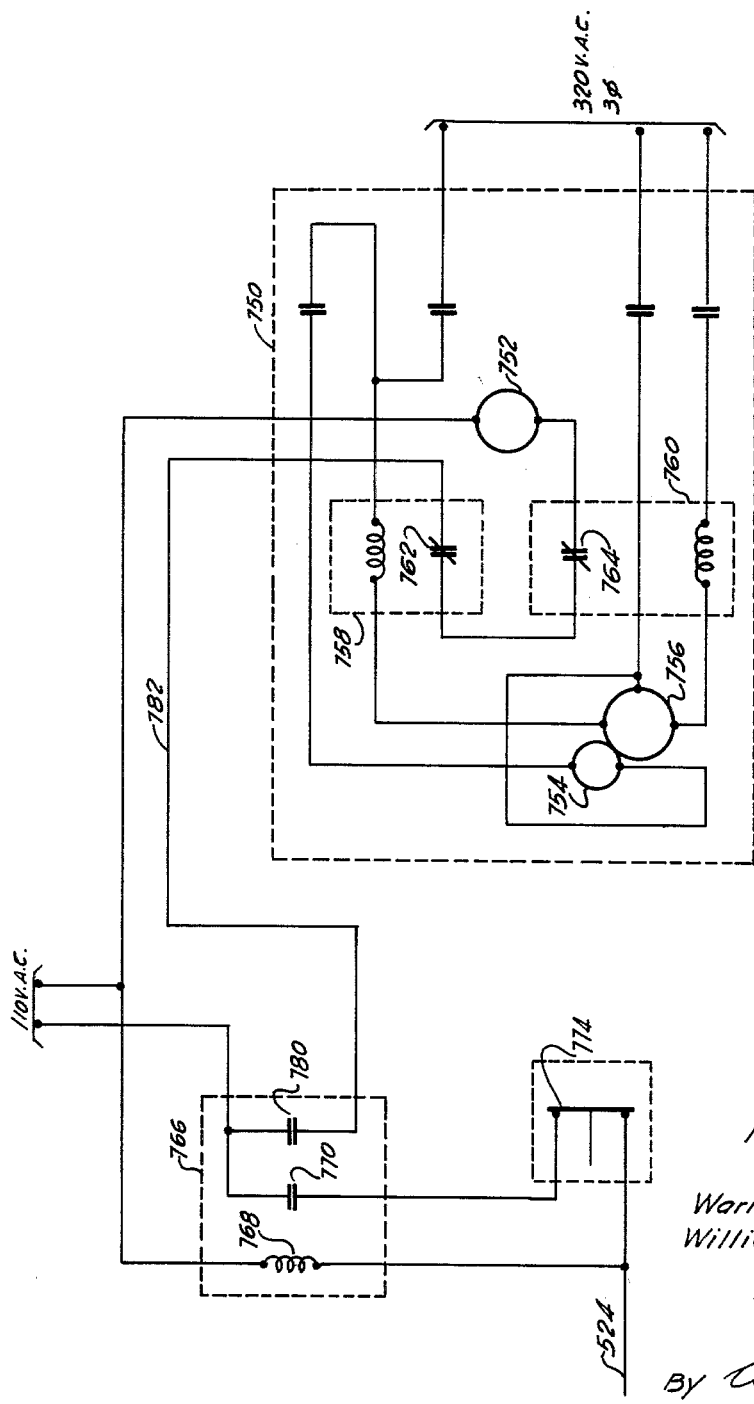

A motor start circuit 750 (FIG. 8) is provided for the load mechanism 46–1. The circuit 750 is generally similar to the storage belt motor start circuit 663. Thus the circuit 750 includes a motor start relay or coil 752 and an electrical brake 754 and a motor 756 controlled by the relay. The circuit also includes overload relays 758 and 760 which include normally closed contacts 762 and 764 in the operating circuit of the relay 752.

A lockup relay 766 is provided for energizing and maintaining energized the coil of the motor start relay 752. The lockup relay 766 includes a coil 768 which is initially energized when, as described above, the contacts 514 (FIG. 5) are closed to connect one terminal of a 110 volt source of alternating current to the conductor 524. One terminal of the coil 768 is connected to the conductor 524 and the other terminal is connected to the other terminal of the alternating current source by conductor 776. When the relay 766 is actuated, contacts 770 are closed to maintain the relay energized over a circuit including conductor 772, relay winding 768, a limit switch 774, contacts 770 and conductor 776.

Contacts 780 of the lockup relay 766 complete a circuit for the winding of the motor start relay 752 including conductor 776, conductor 782, contacts 780, 762 and 764, the winding of the relay 752, and conductor 772.

The load mechanism may be any one of a number of suitable mechanisms now available commercially. These mechanisms are characterized by an operating cycle which causes their paddles to be moved to an extended position and then retracted. When the paddles are retracted, the limit switch 774 is actuated to release the lockup switch 766. This in turn causes the motor start coil 752 to release, whereupon the brake 754 is rendered effective to stop the mechanism, and the motor 756 is deenergized.

The shift register circuits utilized in the main memory unit 80 will now be described in detail. Except as otherwise indicated, the shift register circuits of the main memory are substantially the same as those of the buffer memory stage 282 of FIG. 6 described above. It will be recalled that the routing information is in binary code form having seven information digits or bits and one parity check digit or bit. Thus each routing code will have eight bits represented by either zero or one, and this information must be stored within each stage of the buffer memory units.

Accordingly, each stage of the main memory unit will comprise eight sections, each of which sections includes a bistable flip-flop circuit. The first and last sections 600–1 and 600–8 of the first main memory stage 82–1 are shown in FIG. 10, and the first and last sections 800–1 and 800–8 of the second stage 82–2 are shown in FIG. 11.

The section 600–1 includes a flip-flop circuit 802 comprising a pair of transistors 804 and 806. The base of each transistor is cross coupled to the collector of the other transistor by means of the cross coupling resistors 808 and 810. The transistor emitters are grounded, and the collectors are connected to a negative 96 volt potential by means of resistors 812 and 814. The bases of the transistors are connected to a positive 24 volt bias potential by way of resistors 816 and 818.

The transistor 804 is considered to be the 1 side of the flip-flop and the transistor 806 is considered the 0 side of the flip-flop. When no information is in the section formed by the flip-flop, a zero is to be stored therein. A zero is represented by the presence of a negative 64 volt potential at the collector of transistor 806 to which the output lead 604–1 is connected. This negative 64 volt potential appears at the collector when the transistor 804 is conducting and transistor 806 is nonconducting. Thus a zero stored in the flip-flop circuit 802 is identified by conduction by the transistor 804 and nonconduction by the transistor 806.

In order to change the state of the flip-flop 802 from a zero to a one, it is necessary to cut off the transistor 804 and to cause the transistor 806 to conduct. This is accomplished in the section 600–1 by applying ground potential to the collector of the transistor 806 by way of the output section 73–1 of the input logic circuit 72 and the conductor 604–1 as described above when a code is transferred from the third stage 327 of the buffer memory unit 70–1 to the main memory. The transistor 806 will be cut off and negative 64 volt potential will appear at its collector.

An and circuit 820 is coupled to the base of transistor 806 by way of a capacitor 822 and a resistor 824. An and circuit 826 is coupled to the base of transistor 804 by way of a capacitor 828 and resistor 830. The and circuit 820 includes a pair of input leads, 832 and the shift pulse conductor S0 of the pulse generator 100, which are connected to a junction 834 by means of diodes 836 and 838. The and circuit 826 includes a pair of input leads, 844 and the shift pulse conductor S0, connected to a junction 846 by diodes 848 and 850. A negative 96 volt potential is connected to the junctions 834 and 846 by means of resistors 840 and 841.

It will be recalled that the stage 82–1 is checked by the input logic circuit 72 for the presence or absence of a code indicating the presence or absence of a package on the main belt in the zone corresponding to the stage 82–1. Means must therefore be provided to reset the stage 82–1 to an eight zero bit empty belt code. The input leads 832 and 844 are normally connected to open circuit and ground potential respectively by contacts 852 and 854 of a test switch 856. As described above with respect to the buffer memory section 280–1 (FIG. 6), a negative pulse applied alternatively to the junction 834 or 846 will cause the cut off of transistor 806 or 804 in the event they are conducting. The ground potential on the lead 844 maintains the junction 846 at ground potential. However, the open circuit connection of lead 832 permits the junction 834 to go negative in response to each negative 64 volt shift pulse. This cuts off the transistor 806 if it is conducting to reset the section 600–1 to its zero state.

The sections 600–2 to 600–8 are similar to section 600–1. Thus the section 600–8 includes a flip-flop circuit 860 with and input circuits 862 and 864 for resetting the section to its zero state. One code bits are transferred from the buffer memory to the section 600–8 by way of the zero output lead 604–8 as described above.

The sections 800–1 to 800–8 of stage 82–2 are generally similar to sections 600–1 to 600–8. Thus the sections 800–1 to 800–8 include flip-flop circuits 900–1 to 900–8 with zero input leads 880–1 to 880–8 and one input leads 884–1 to 884–8. Zero and one output leads 902–1 to 902–8 and 904–1 to 904–8 are provided. Pairs of and circuits 890–1 and 892–1 to 890–8 and 892–8 include the input leads 880–1 and 884–1 to 880–8 and 884–8 and the common input shift pulse conductor S0.

The zero output leads 604–1 to 604–8 of stage 82–1 are connected to the zero input leads 880–1 to 880–8 of the stage 82–2. One output leads 882–1 to 882–8 of stage 82–1 are connected to one input leads 884–1 to 884–8 of stage 82–2. When ones are stored in sections 600–1 to 600–8 their one output conductors apply a negative 64 volt potential to the one input conductors of sections 800–1 to 800–8; and ground potential is applied by the zero output conductors of sections 600–1 to 600–8 to the zero input conductors of sections 800–1 to 800–8. Similarly, the sections 600–1 to 600–8 storing zeros will apply a negative 64 volt potential to the corresponding zero inputs of sections 800–1 to 800–8 and ground potential to the one inputs of sections 800–1 to 800–8.

When a shift pulse is then applied to the conductor S0, the ones and zeros in the sections 600–1 to 600–8 are transferred to the sections 800–1 to 800–8. This is accomplished by opening those and circuits 890–1 to 890–8 and 892–1 to 892–8 which have a negative 64 volt potential on their input leads 884–1 to 884–8 and 880–1 to 880–8 to cut off the desired transistor in each flip-flop circuit. The same shift pulse also resets the sections of the first stage 82–1 to their zero states.

The codes are sequentially advanced from stage to stage in the main memory in this manner until they are transferred out of the last stage 82–n. The codes are transferred from a buffer memory 70–1 to the main memory stage 82–1 when the packages are transferred to the main belt in a zone corresponding to the stage 82–1. Therefore, the codes are advanced in the main memory coincident with the movement of the package along the path of the main belt.

Neon tubes 895–1 to 895–8 are connected in the collector circuits of the one transistors in the main memory stages 600–1 to 600–8. The neon tubes are energized when these transistors are conducting to indicate the zero state of each stage. Neon tubes 896–1 to 896–8 are connected in the collector circuits of the zero transistors of the stages 600–1 to 600–8. These tubes are energized when the transistors are conducting to indicate the one state of the sections.

An and circuit connected to the collectors of the one transistors of the sections 600–1 to 600–8 includes diodes 897–1 to 897–8, a resistor 898, and a neon tube 899. The neon tube 899 will be extinguished only when all ones are stored in sections 600–1 to 600–8.

Similarly, an and circuit connected to the collectors of the zero transistors of the stages 600–1 to 600–8 includes diodes 901–1 to 901–8, a resistor 903, and a neon tube 905. The neon tube 905 will be extinguished only when all zeros are stored in the stages 600–1 to 600–8.

Similar and circuits with neon tubes such as 899 and 905 are provided in each stage of the main memory unit 80. These neon tubes are displayed on a panel 907 of FIG. 24 for test and maintenance purposes.

The test procedure to check the proper transfer of zeros and ones from stage to stage in the main memory is afforded by means of the neon tubes such as 899 and 905 and the test switch 856. With the test switch in its normal position shown in FIG. 9 zeros will be applied to each section 600–1 to 600–8 incident to each shift pulse. This will cause the neon tube 899 to be energized and the neon tube 905 to be extinguished. Each of these eight bit zero codes will be transferred sequentially from stage to stage through the shift register. The tubes corresponding to 905 for each succeeding stage will be progressively extinguished as the code progresses through the succeeding stages. Then the key 856 is actuated for a desired interval whereby the input lead 844 has ground removed therefrom and the input lead 832 has ground applied thereto. This will result in opening of the and gates such as 826 of the sections 600–1 to 600–8 in response to each shift pulse to transfer ones into each of the sections 600–1 to 600–8. These eight bit one codes cause the neon tube 899 to be extinguished and the neon tube 905 will conduct. The eight bit one code will be advanced from stage to stage in the main memory in response to succeeding shift pulses and the neon tubes in succeeding stages corresponding to the tube 899 will be progressively extinguished as the code is advanced from stage to stage. Several eight bit one codes may be entered into the stage 82–1 and advanced in this manner through succeeding stages whereby visual observation of the neon tubes corresponding to 899 will indicate the proper or improper operation of the main memory.

In the preferred embodiment, the eight section stages of the buffer and main memory units are formed on individual plug-in circuit boards. Since they may be easily replaced, this achieves ease of maintenance. The neon tubes such as 895–1 and 896–1 are preferably positioned on the boards themselves, and the boards are usually open for visual inspection. Thus the instantaneous zero or one state of each section of each stage is readily ascertained.

The parity check circuits will now be described in detail. A parity check is made in one stage of each buffer memory unit and in certain stages of the main memory unit. By way of example, stage 282 of the buffer memory and stage 82–2 of the main memory are provided with parity check circuits.

And circuits 910–1 to 910–8 are connected to the one side outputs of the sections 800–1 to 800–8. These and circuits sequentially apply pulses from each of the sections 800–1 to 800–8 set in its one state to a counter for the purpose of determining the presence or absence of an even number of one bits in each code advanced through the stage.

The timing of the pulses applied to the counter is provided by connecting the inputs 912–1 to 912–8 of the and circuits to the S1 to S8 conductors of the pulse generator 100 respectively. A negative 64 volt pulse on one of the inputs 912–1 to 912–8 opens the and circuit if a negative 64 volt potential also exists on the other input 904–1 to 904–8 to apply a negative 64 volt potential to the conductor 914. Each pulse applied to the conductor 914 by reason of a one being stored in the particular section when a pulse is applied to one of the conductors S1 to S8 changes the potential on the base of a transistor 916. The transistor 916 is normally biased to cutoff by a resistor network including resistors 918, 920 and 922 of the and circuits 910. The negative 64 volt potential on conductor 914 causes the positive 12 volt cutoff bias applied to the base of the transistor 916 to be reduced to approximately minus 20 volts causing the transistor to conduct.

When the transistor 916 begins to conduct, the collector of the transistor falls from a negative 64 volt potential to ground. The collector is in turn connected to the base of a transistor 926 which is normally conducting by virtue of a negative 24 volt bias potential applied to its base by resistors 928, 930 and 932. When the collector of the transistor 916 falls to ground potential, the base of the transistor 926 is raised to a positive 12 volt potential to cut off the transistor 926. As a result, the collector of the transistor 926 falls from ground to minus 64 volts. Thus the transistors 916 and 926 provide amplification of the signals produced by the and circuits 910–1 to 910–8 for parity check and also provide a double negation of the polarity of the signals so produced.

The output signals produced by the transistor 926 are applied to both inputs of a unique flip-flop circuit 934 arranged so as to be a counter. The flip-flop circuit comprises a first transistor 936 which is normally conducting and a second transistor 938 which is normally nonconducting. A pair of and circuits 937 and 939 form inputs to the transistors. Each time that a negative pulse is applied by the transistor 926 to the two inputs to the flip-flop circuit the transistor which is nonconducting fires, thereby cutting off the conducting transistor. The transistor flip-flop circuit in the counter is similar to those in each of the shift register sections except that the output of each of the transistors is connected to the input to the other transistor. Also, as indicated above, the two inputs to the transistors are common.

More particularly, the bases of the transistors 936 and 938 are connected to a positive 24 volt biasing potential by way of resistors 940 and 942. The bases are also coupled to the collectors of the opposite transistors by way of cross coupling resistors 944 and 946. The collector of the transistor 936 is connected to the input to the transistor 938 by way of a conductor 947 and a diode 948. Similarly, the collector of the transistor 938 is connected to the input to the transistor 936 by way of a conductor 949 and a diode 950. Thus the diodes 948 and 950 together with diodes 952 and 954 of the coupling circuit between the transistor 926 and the flip-flop circuit 934 form a part of the and circuits 937 and 939. These and circuits also include diodes 955 and 956, capacitors 957 and 958, and resistors 959 and 960.

As indicated earlier, the transistor 936 is normally conducting prior to receiving any of the pulses for parity check, and therefore the ground potential on its collector is extended to the diode 948 in the input circuit to the transistor 938. Similarly, the negative 64 volt potential on the collector of the transistor 938 is extended to the diode 950 in the input circuit of the transistor 936.

When a negative pulse is then applied to the input and circuits 937 and 939 by the transistor 926, the capacitor 957 will be charged by virtue of negative 64 volt potentials being applied to both diodes 950 and 952. On the other hand, the capacitor 958 cannot be similarly charged because the ground potential applied by the collector of the transistor 936 to the diode 948 maintains the junction 961 at ground potential.

At the end of the pulse from transistor 926, a high positive voltage is applied by the capacitor 957 to the base of the transistor 936 to cut off the transistor. This in turn causes the transistor 938 to conduct. When the next succeeding pulse is received from the transistor 926, the transistor 938 is cut off by a positive voltage applied to its base by capacitor 958 in a similar manner to that described above with respect to capacitor 957, and the transistor 936 is again permitted to conduct.

Thus, each succeeding pulse applied to the flip-flop circuit 934 by the transistor 926 changes the state of the circuit 934 to perform a counting function. Since a correct code will have an even number of one bits to be counted, the flip-flop circuit will normally be reset by the even number of bits for the next parity check.

The collectors of the transistors 936 and 938 are also connected respectively to a pair of input and circuits 962 and 963 of a sampling flip-flop circuit 964 by way of conductors 947 and 949 and diodes 965 and 966 respectively. The and circuit 962 also includes a diode 967, a capacitor 968, and resistors 969 and 970. The and circuit 963 also includes a diode 971, a capacitor 972 and resistors 973 and 974.

The sampling flip-flop circuit 964 is generally similar to the flip-flop circuits in the counter and in the sections of the shift registers. Thus the circuit 964 includes a pair of transistors 975 and 976, the bases of which are connected to a positive 24 volt biasing potential by way of bias resistors 977 and 978. The bases are also coupled to the collectors of the opposite transistors by way of cross coupling resistors 979 and 980. The emitters are grounded and the collectors are connected to a negative 96 volt potential by means of resistors 981 and 982.

The transistor 975 normally conducts and the transistor 976 is cut off. The transistor state is changed only if the counting flip-flop 934 has counted an odd number of pulses.

Conductor S9 from the pulse generator 100 is connected to the two input circuits by way of the diodes 967 and 971. The conductor S9 is grounded except when it applies a negative 64 volt potential pulse (one-tenth of a second after the flip-flop 934 has counted the parity pulses) to the various circuits to which it is connected. This ground potential maintains the and circuits 962 and 963 open to prevent changes in the state of the parity check counting flip-flop 934 from causing a change of state within the sampling flip-flop 964.

However, when the negative 64 volt pulse is applied to the conductor S9, the input and circuit 962 or 963 which is connected to the collector of the nonconducting transistor 936 or 938 opens. If an even number of pulses corresponding to a correct code has been counted, the collector of the nonconducting transistor 938 will have a negative 64 volt potential applied thereto, which potential is extended to the input and circuit 963 of the transistor 976 to cause the capacitor 972 thereof to be charged. At the end of the S9 pulse, the capacitor applies a high positive voltage to the base of the transistor 976; but this is of no consequence since the transistor is already cut off.

If an odd number of pulses has been counted, the negative 64 volt potential on the collector of the nonconducting transistor 936 which is extended to the and circuit 962 and the pulse on S9 will open the and circuit to charge the capacitor 968. At the end of the pulse on conductor S9, the capacitor applies a positive bias to the base of the transistor 975 to cut off the latter and to cause transistor 976 to conduct. When the transistor 975 is cut off, its collector goes to a negative 64 volt potential to extinguish the parity check lamp 984.

One-tenth of a second later a pulse is applied to the conductor S0 by the pulse generator 100 to apply a negative bias potential to the base of the transistor 985. The transistor 985 begins to conduct and ground potential appears at its collector. This ground potential is applied by way of a diode 986 and conductor 947 to the collector of the nonconducting transistor 936. This ground potential will cause the transistor 936 to again conduct, cutting off the transistor 938, thus resetting the counting flip-flop 934 for the next parity check.

The sampling flip-flop 964 will be reset by the pulse on conductor S9 only after the next correct code is counted. If the next code which is counted has an odd number of ones, the and circuit 962 is again opened by the pulse on conductor S9, but this is of no consequence since the transistor 975 is already cut off. However, if the next counted code is correct, the and circuit 963 is opened by the next pulse on conductor S9. The capacitor 972 applies a positive bias to the base of the transistor 976 to cut off the latter and to cause conduction by transistor 975. This resets the sampling flip-flop 964 and again energizes the neon tube 984.

The parity check sampling flip-flop circuits in the buffer memory units are preferably reset manually rather than in the manner described above with respect to circuit 964. To achieve manual reset, the capacitor 972 is removed; and a switch 990 (common to all buffer memory units) applies ground potential to the collector of transistor 975 to reset the circuit.

The circuits for detecting the presence of routing codes assigned to the transfer mechanisms and the circuits for operating the transfer mechanisms to unload packages from the main belt will now be described.

The transfer mechanisms 48-1 to 48-n are provided with decoders 90-1 to 90-n and control circuits 92-1 to 92-n. It is the function of each decoder to detect the presence of a routing code or codes assigned to its transfer mechanism in a main memory stage corresponding to the zone in which the transfer mechanism is located. Upon detection of an assigned code the decoder will in turn apply a start pulse to the corresponding transfer mechanism control circuit to initiate the operation of the transfer mechanism.

The decoders 90-1 to 90-n may be of three general types. For example, the decoder 90-n has means for detecting a single code in the main memory stage 82-n for operating its transfer mechanism 48-n in one direction only. On the other hand, the decoder 90-1 includes two decoding circuits, each for detecting a different assigned code in the main memory stage 82-8 for operating the transfer mechanism 48-1 in one direction or the other, depending upon which assigned code is detected. Another type decoder which may be used is one in which means are provided for detecting either one of two codes assigned to a transfer mechanism for causing the operation of that mechanism in one direction only regardless of which assigned code is detected.

Figures 13, 14:
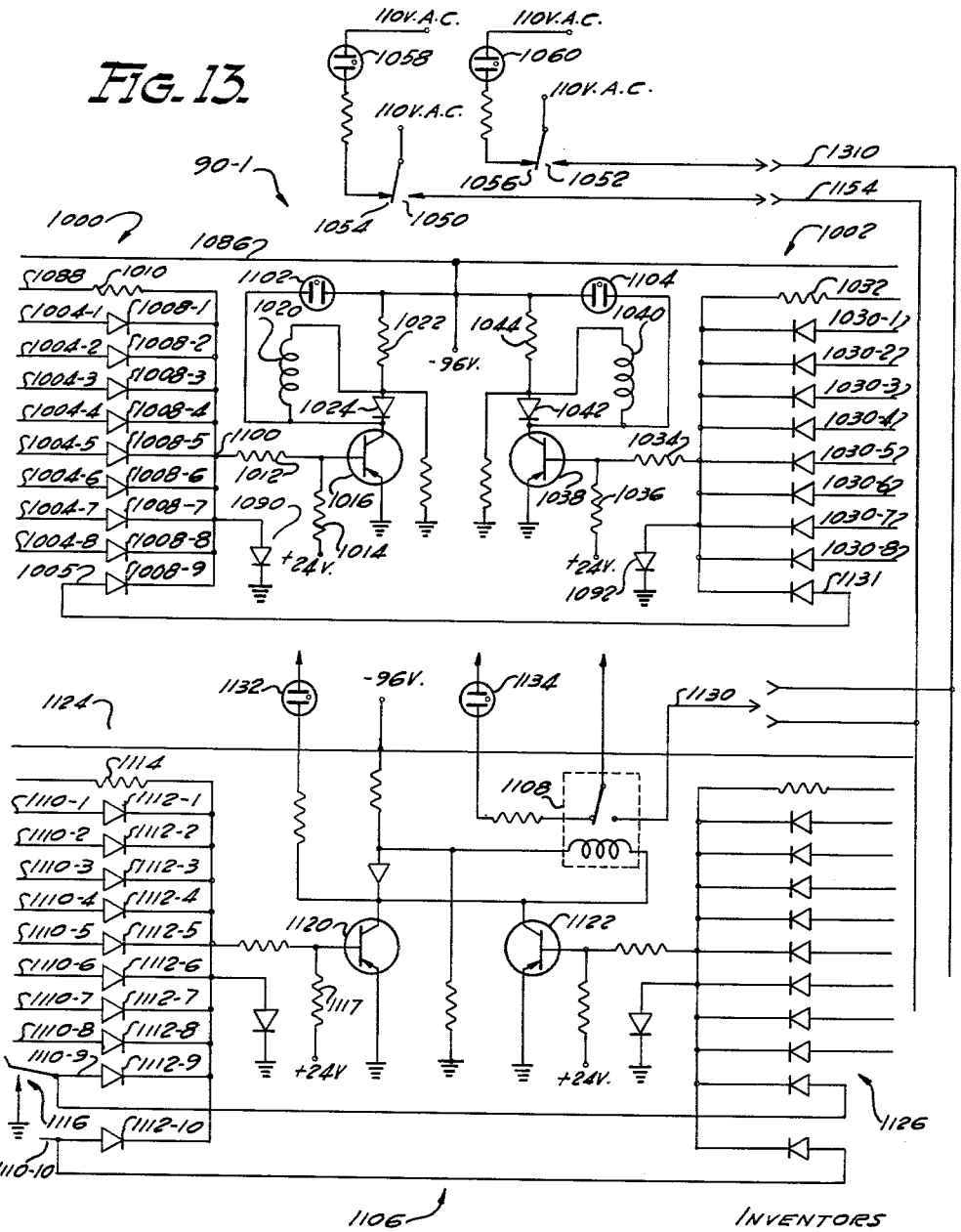
FIGS. 13 and 14 are schematic diagrams showing two embodiments of decoders utilizing the teachings of the present invention.

Reference may be had to FIGS. 13, 14, 15, 15A and 16 for a detailed description of the decoders and the transfer mechanism control circuits. FIG. 13 discloses the details of the decoder 90-1 which detects either of two codes assigned to the transfer mechanism 48-1; and, depending upon which code is detected, it operates the transfer mechanism in one direction or another to discharge a package from the main conveyor belt.

The decoder 90-1 includes right and left and circuits 1000 and 1002. The and circuit 1000 comprises input leads 1004-1 to 1004-8 which are connected to the outputs of the shift register stage 82-8 in the main memory unit and a timing pulse input lead 1005 which it is assumed is connected to the S1 conductor of the pulse generator 100.

The particular pulse generator conductor to which the decoder 90-1 is connected will depend upon which six inch interval in the zone in which its transfer mechanism is positioned. Thus assuming that the transfer mechanism 48-1 is positioned within the second six inch interval within the zone, the decoder 90-1 is connected to the S1 conductor. This will effect proper timing of the transfer mechanism to cause its paddle to strike the center of the package during the discharge operation.

The circuit 1000 also includes diodes 1008-1 to 1008-9 connected to the input leads, a resistor 1010 adapted for connection to a negative 96 volt potential, a resistor 1012, and a resistor 1014 which is connected to a positive 24 volt potential. The resistors 1010, 1012 and 1014 form a voltage divider circuit which normally applies a positive cutoff potential to the base of a transistor 1016 to prevent conduction of the latter.

The transistor 1016 has its emitter grounded and has its collector connected to a negative 96 volt potential by way of a relay coil 1020 and a resistor 1022.

A diode 1024 is connected across the relay coil 1020 to prevent damage to the transistor as a result of back voltage produced by the coil 1020 when the transistor ceases to conduct.

The and circuit 1002 is similar to the circuit 1000 and includes eight input leads 1030–1 to 1030–8 adapted for connection with the outputs of the shifts register stage 82–8 of the main memory and a ninth input lead 1031 connected to the S1 conductor of the pulse generator. The circuit 1002 also includes a voltage divider comprising a resistor 1032 adapted for connection with a negative 96 volt potential, a resistor 1034, and a resistor 1036 connected to a positive 24 volt potential. The voltage divider applies a positive cutoff bias to a transistor 1038. The transistor 1038 has a grounded emitter and includes a relay coil 1040 connected in its collector circuit. A diode 1042 is connected across the coil 1040, and a resistor 1044 connects the coil to a negative 96 volt potential.

The relay coils 1020 and 1042 operate contact sets 1050 and 1052 which when closed initiate the operation of the transfer mechanism 48–1 in one direction or the other. The relay coils also operate normally closed contacts 1054 and 1056 which normally complete circuits for energizing neon tubes 1058 and 1060.

Figure 16:
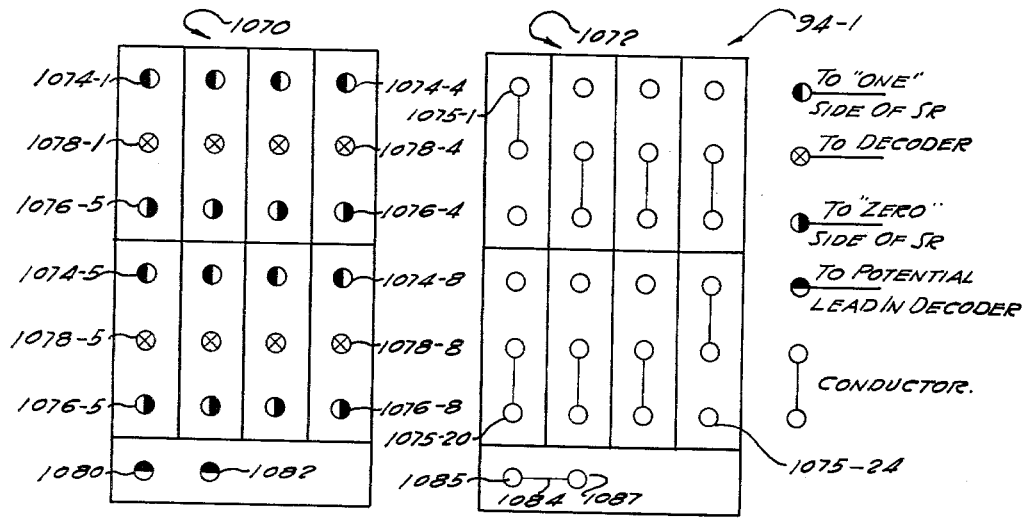
FIG. 16 is a diagrammatic representation of one of the distributions plugs utilized in the present invention.

Connections to the circuits 1000 and 1002 are made by means of distribution plugs such as 94–1 of FIG. 16. The distribution plug 94–1 includes a female connector 1070 and a replaceable plug-in male plug 1072. The female connector is permanently connected to one decoder circuit such as the circuit 1000 and to a main memory stage such as 82–8 in accordance with the legend shown in FIG. 16.

Thus the upper horizontal row of terminals 1074–1 to 1074–4 and the fourth from the top row of terminals 1074–5 to 1074–8 are permanently wired to the one output conductors of the eight sections of the main memory stage 82–8. These one output conductors in stage 82–8 correspond to output conductors 882–1 to 882–8 of FIG. 10 which are similar conductors for the stage 82–1.

The third and sixth rows of terminals from the top on the female connectors 1076–1 to 1076–8 are permanently connected to the zero output conductors of the eight sections of the main memory shift register stage 82–8. These zero output conductors of stage 82–8 correspond to conductors 604–1 to 604–8 of stage 82–1 of FIG. 10. The second and fifth rows of terminals 1078–1 to 1078–8 are permanently connected to the decoder inputs 1004–1 to 1004–8 respectively.

The male plug is provided with printed circuit means for making connections from the eight decoder input terminals 1078–1 to 1078–8 to the desired zero or one outputs of the shift register stage 82–8. Since the male plugs are of the plug-in type and are replaceable, any desired code may be set up between the decoder and the main memory stage 82–8. This lends appreciable flexibility to the system.

The male plug 1072 of FIG. 16 includes terminals 1075–1 to 1075–24 which are adapted to register respectively with terminals 1074–1 to 1074–4, 1078–1 to 1078–4, 1076–1 to 1076–4, 1074–5 to 1074–8, 1078–5 to 1078–8 and 1076–5 to 1076–8. Circuit connections between appropriate terminals 1075 connect the decoder input terminals 1078–1 to 1078–8 respectively to the appropriate one and zero output connections of the eight sections of the shift register stage 82–8 to detect the binary code 10000001.

The decoder circuit 1002 will have a similar female connector-male plug connection to the selected zero and one outputs of the main memory stage 82–8 to detect a different assigned code.

A pair of terminals 1080 and 1082 of the female connector 1070 are connected to conductors 1086 and 1088 of FIG. 13. A conductor 1084 and terminals 1085 and 1087 of the male plug 1072 connect the negative 96 volt potential of FIG. 13 to the resistor 1010 by way of conductor 1086, terminals 1080 and 1085, conductor 1084, terminals 1087 and 1082 and conductor 1088. A pair of diodes 1090 and 1092 maintain the output of the and circuits 1000 and 1002 at ground potential when the male distribution plug is disconnected.

When the assigned code 10000001 is transferred into the shift register stage 82–8, a negative 64 volt potential will be applied to the input leads 1004–1 to 1004–8 of the and circuit 1000. This occurs incident to the application of a shift pulse to the S0 conductor in each section of stage 82–8. One-tenth of a second later a pulse is applied to the S1 conductor. This pulse is applied to the input lead 1005 to remove the ground potential from the junction 1100 of the and circuit 1000 and to lower the potential at the junction to a negative 64 volts. This causes the transistor 1016 to conduct, thereby energizing the coil 1020. Energization of the coil 1020 causes closure of the contacts 1050 to apply a start pulse to the control circuit 92–1 of FIGS. 15 and 15A. The pulse is applied to the conductor S1 for fifty milliseconds and the start pulse produced by the contacts 1050 will be in the order of fifty milliseconds.

At the same time the coil 1020 opens contacts 1054 to extinguish the neon tube 1058. When the transistor begins to conduct, it also energizes a neon tube 1102 in its collector circuit. Thus energization of the neon tube 1102 indicates conduction by the transistor 1016 and proper code detection. Extinguishing of the neon tube 1058 indicates proper operation of contacts 1050 to initiate the operation of the transfer mechanism 92–1. Similarly, extinguishing of the neon tube 1060 will indicate the proper operation of the contatcts 1052 to initiate the operation of the transfer mechanism, and energization of a neon tube 1104 in the collector circuit of the transistor 1038 will indicate energization of the transistor and proper detection of a code.

These neon tubes 1058, 1060, 1102 and 1104 may be utilized in test procedures by sending through the routing codes which the decoder 90–1 is adapted to detect and visually observing the neon tubes to determine if proper operation and detection are achieved.

FIG. 14 discloses an alternative decoder 1106 which is adapted to detect either of two codes and upon such detection to operate a relay 1108 to initiate the operation of a transfer mechanism in one direction only. The decoder 1106 includes an and circuit 1124 comprising ten input leads 1110–1 to 1110–10. The input leads 1110–1 to 1110–8 and 1110–10, together with diodes 1112–1 to 1112–8 and 1112–10 and resistors 1114, 1115 and 1117, comprise an and circuit similar to circuit 1000. The resistor 1114 is adapted to be connected to a negative 96 volt potential in the same manner as the resistor 1010 of FIG. 13.

However, in the and circuit 1124, the conductor 1110–9 is normally open which permits operation of the decoder. The conductor 1110–9 includes a manually operable switch 1116 which can be operated to apply ground to the conductor, thereby preventing opening of the and circuit and thereby locking out the decoder 1106. A similar lockout circuit can be applied to the decoder 90–1 where desired.

The decoder 1106 includes a second and circuit 1126 similar to circuit 1124. The decoder 1106 also includes transistors 1120 and 1122 which are operated respectively by the left and right and circuits 1124 and 1126 of the decoder upon detection of the assigned codes. Conduction by either transistor operates the relay 1108 to apply a pulse to the conductor 1130 to initiate the operation of a transfer mechanism. A neon tube 1132 indicates conduction of either transistor 1120 or 1122 and therefore the detection of an assigned code. A neon tube 1134 indicates the proper operation of the relay 1108 to apply a pulse to the conductor 1130.

The decoder 94–n, which is adapted to detect only one assigned code in the stage 82–n, is similar to the decoder 1106 except that only one and circuit 1124 or 1126 and only one transistor 1120 or 1122 are utilized.

Figure 15:
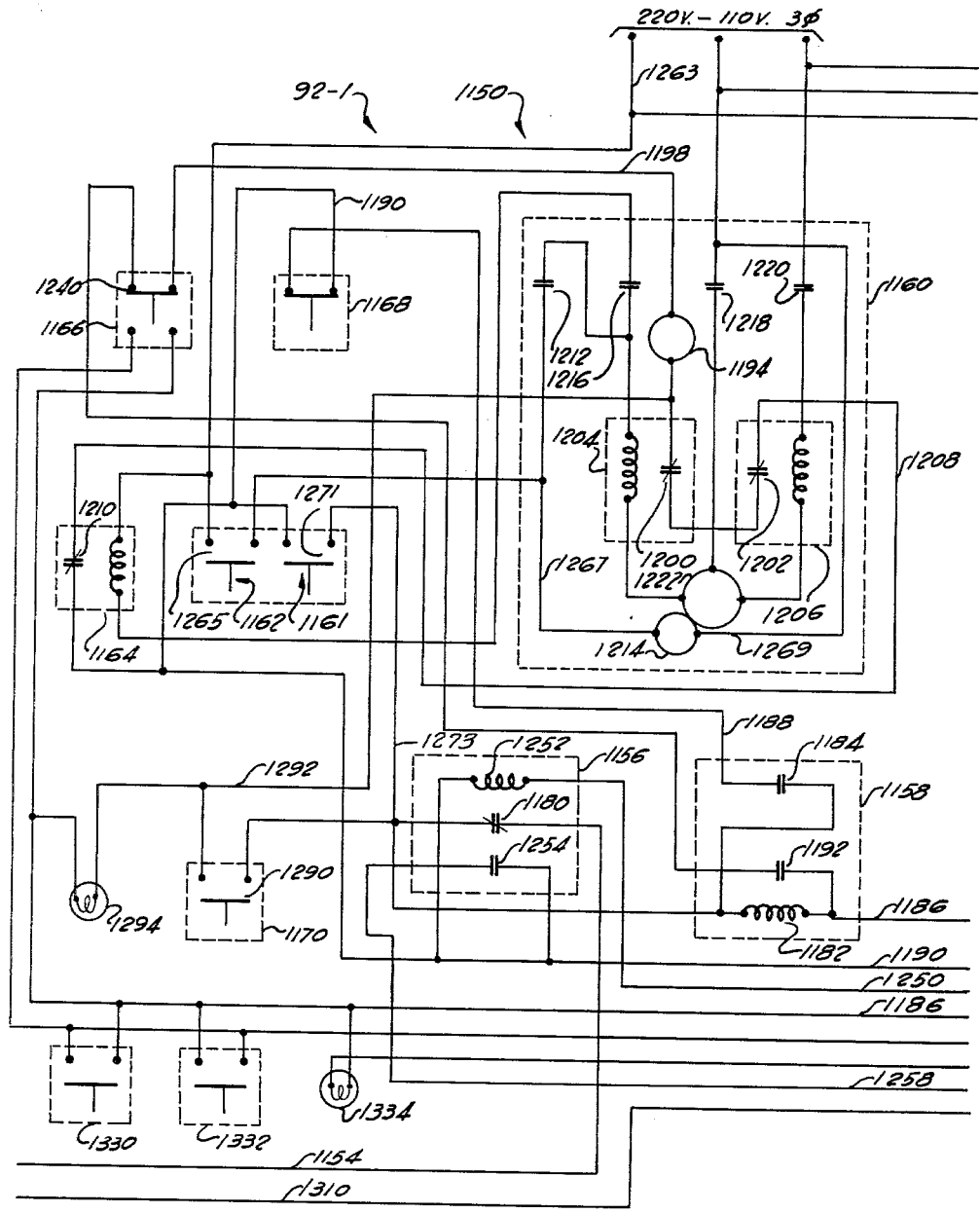
FIGS. 15 and 15A are a schematic diagram of the operating circuit for a transfer mechanism.
Figure 15A:
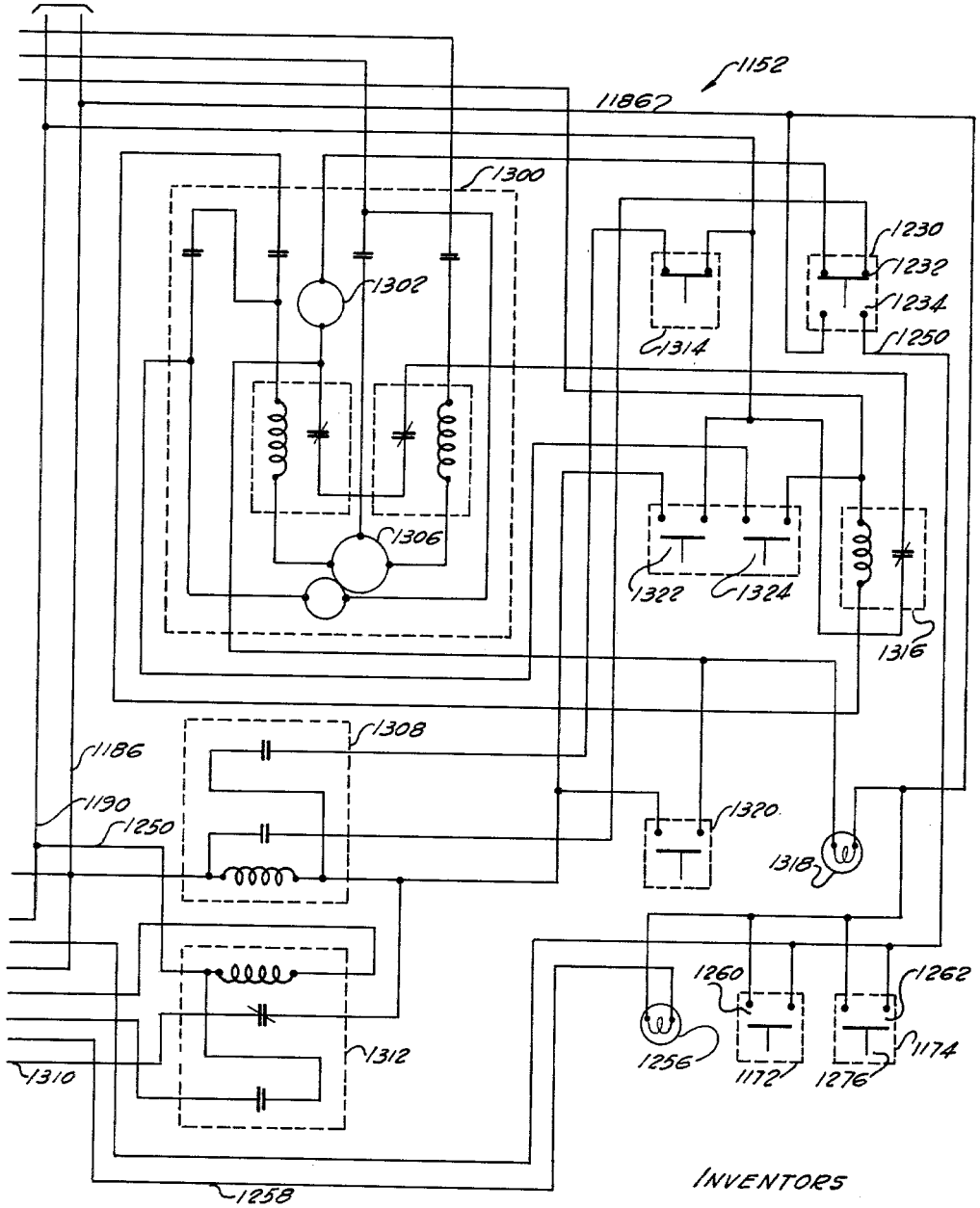

The transfer mechanism control circuit 92–1 of FIGS. 15 and 15A comprises a left section 1150 for operating the transfer mechanism 48–1 in one direction and a right section 1152 for operating the transfer mechanism 48–1 in the opposite direction. The left and right sections 1150 and 1152 are in some respects similar to the loading mechanism control circuit described above.

The section 1150 includes an input signal conductor 1154 (FIG. 15), a backup relay 1156, a lockup relay 1158, a motor start circuit 1160, manually operable test switches 1161 and 1162, a reset relay 1164, a home limit switch 1166, a disabling limit switch 1168, a test switch 1170, a change cart switch 1172 (FIG. 15A), and a backup protection switch 1174.

When an alternating current pulse is applied by the contacts 1050 of the decoder circuit of FIG. 13 as described above to the conductor 1154, it is extended through normally closed contacts 1180 of the backup relay 1156, through the coil 1182 of the lockup relay 1158 and conductor 1186 to the other terminal of the alternating current source to energize the coil 1182. The relay 1158 includes contacts 1184 closed upon energization of coil 1182 to maintain the coil energized over a circuit including the alternating current source, the conductor 1186, the coil 1182, contacts 1184, conductor 1188, the disabling limit switch 1168, conductor 1190, to the other terminal of the alternating current source.

The lockup relay 1158 also includes contacts 1192 which when closed upon energization of the relay 1182 complete a circuit for the motor start coil 1194 of the motor start circuit 1160. This circuit extends from one terminal of the alternating current source through conductor 1186, contacts 1192, conductor 1196, the normally closed contacts 1240 of the home limit switch 1166, conductor 1198, the coil 1194, normally closed contacts 1200 and 1202 of overload relays 1204 and 1206, conductor 1208, the normally closed contacts 1210 of the reset relay 1164, and conductor 1190 to the other terminal of the alternating current source.

Thus energization of the lockup relay 1182 will cause consequent energization of the motor start coil 1194. The coil 1194 operates contacts 1212 to energize the electrical brake 1214 of the motor start circuit to release a transfer mechanism motor 1222. The coil 1194 also operates contacts 1216, 1218 and 1220 to complete an obvious circuit from a three phase source to the transfer mechanism motor 1222. The motor 1222 causes a paddle 1270 (FIG. 1) of the transfer mechanism 48–1 to advance across the main conveyor belt to discharge a package into a chute 1272 and then to return to its normal retracted position.

As the paddle approaches its retracted position, the disabling switch 1168 is actuated to open the hold circuit of the lockup relay. The lockup relay restores to de-energize the motor start coil 1194. The coil opens the circuits for the motor 1222 and the brake 1214. The brake stops the motor and paddle.

Upon initial movement of the transfer mechanism by the motor 1122 as described above, the transfer mechanism causes a right home limit switch 1230 (FIG. 15A) to operate to open contacts 1232 and close contacts 1234.

Opening of the contacts 1232 prevents operation of a motor start circuit 1300 of the control circuit 1152. Initial movement of the transfer mechanism 48–1 in the opposite direction by section 1152 operates the home limit switch 1166. It will be recalled that the contacts 1240 of the home limit switch 1166 are in the operating circuit of the start coil 1194 of the motor start circuit 1160. Opening of the contacts 1240 prevents energization of the coil 1194 in response to the energization of the lockup relay coil 1182.

Thus, the switches 1166 and 1230 provide positive protection against operation of the transfer mechanism 48–1 in both directions at the same time.

The home limit switch 1230 in addition to opening contacts 1232 to prevent operation of the left motor control circuit 1300 also closes contacts 1234. When the contacts 1234 close, they complete a circuit for energizing the backup relay 1156 (FIG. 15) over a circuit extending from one terminal of the alternating current source through conductor 1186, contacts 1234, conductor 1250, the coil 1252 of the backup relay 1156, and conductor 1190 to the other terminal of the source.

The backup relay 1156 includes the normally closed contacts 1180 in the circuit for initially energizing the lockup relay 1158. Thus, when the coil 1252 is energized, this circuit is opened by the opening of the contacts 1180. The backup relay 1156 also includes normally open contacts 1254 which when closed energize a warning lamp 1256 (FIG. 15A) over a circuit extending from one terminal of the source through conductor 1190, contacts 1254, conductor 1258, the lamp 1256, and the conductor 1186 to the other terminal of the source. The contacts 1180 prevent a transfer mechanism operating signal appearing at the input conductor 1154 from initiating the operation of transfer mechanism until the relay 1156 is restored at the end of the transfer mechanism operating cycle. This is important in the event that the mechanism does not complete its cycle, for example, due to a jammed mail sack or overload condition.

The backup relay 1156 may also be energized upon manual operation of the change cart switch 1172 or upon the automatic operation of the backup protection switch 1174. The change cart switch 1172 when actuated closes contacts 1260 to complete a circuit for the coil 1252 of the backup relay 1156 over a circuit extending from one terminal of the source of alternating current through conductor 1186, the contacts 1260, the conductor 1250, the coil 1252, and the conductor 1190 to the other terminal of the source. Thus when the change cart switch is operated, the backup relay 1156 will prevent operation of the lockup relay 1158 and its associated motor start circuit 1160 until the change cart switch is manually operated to open the contacts 1260.

When the backup protection switch 1174 is actuated, it closes contacts 1262 to operate the relay 1156 over a circuit similar to that described with respect to switch 1172. Thus the switch 1174 will energize the relay to open contacts 1180 in the left control circuit 1150 to prevent operation of the lockup relay 1158 and its associated motor start circuit 1160 until the contacts 1262 are opened.

Figure 18:
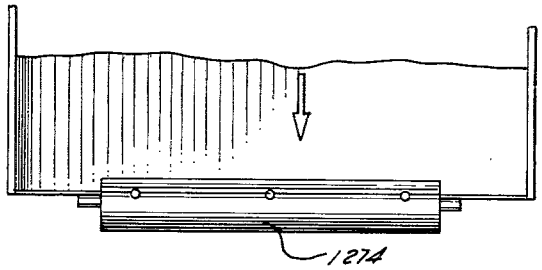
FIGS. 18 and 19 are plan and side elevation views of a switch associated with one of the transfer mechanisms.
Figure 19:
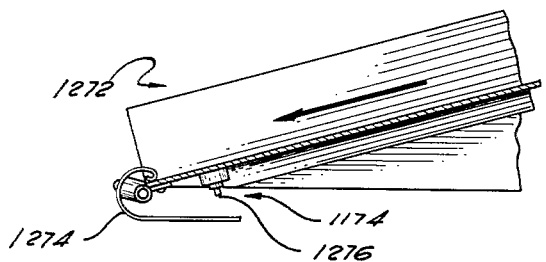

For a better understanding of the functions of switches 1172 and 1174, reference is directed to FIGS. 1, 18 and 19. The transfer mechanisms 48–1 through 48–n may be of the type shown in U.S. Patent No. 3,045,801 issued July 24, 1962, to W. E. Graybeal. It is assumed that the transfer mechanism 48–1 causes movement of the paddle 1270 toward the chute 1272 to discharge a package thereon when the left control circuits 1150 are operated. In a typical installation the entire conveyor system will be in an elevated position with respect to a floor. Carts will be positioned on the floor immediately below the lower free ends of the chutes such as 1272. Packages discharged from the belt 42 to the chute 1272 will slide from the chute into the cart. When a cart is completely filled with packages and it is desired to replace the filled cart with an empty cart, an operator will actuate the change cart switch 1172 which is conveniently located at a position adjacent the chute 1272. Thus, as described above, the transfer mechanism 48-1 will be prevented from discharging a package from the belt 42 to the chute 1272 while the carts are being changed.

A pivotal switch operating arm 1274 (FIGS. 18 and 19) is positioned at the lower end of the chute 1272. The backup protection switch 1174 is supported on the lower side of the chute 1272 immediately to the rear of the pivotal arm 1274 and in a position whereby its plunger 1276 may be engaged by the arm 1274. Each time that a package is discharged from the belt 42 to the chute 1272 and slides down the chute it passes over the arm 1274 to rotate the arm in a counterclockwise direction with respect to FIG. 19. Thus each time that a package is transferred from the belt to the chute the arm 1274 senses the package and momentarily actuates the backup protection switch 1174. This would normally be expected to actuate the backup relay 1156; however, the relay 1156 is a suitable slow-to-operate, fast-to- release relay whereby momentary actuation of the backup protection switch 1174 will not cause the operation of the relay 1156.

However, when a cart positioned below the chute 1272 becomes filled and the packages in the cart are piled to approximately the lower free end of the chute, the next succeeding package will be maintained on the chute at its lower edge by the packages already in the cart. In such an event, the arm 1274 remains in its actuated position to maintain the backup protection switch actuated. This in turn will cause the operation of the backup relay 1156 to prevent subsequent operation of the transfer mechanism to discharge packages from the belt 42 to the chute 1272.

This will not in any way affect the operation of the transfer mechanism 48-1 by the section 1152 of the control circuit 92-1. Thus the section 1152 may be actuated to cause the movement of a paddle 1280 across the belt 42 to discharge a package on a chute 1282.

As soon as the filled cart is removed from beneath the chute 1272 for replacement with an empty cart and the package resting on the arm 1274 is removed, the switch 1174 will be restored to normal. However, before changing carts, the operator will have operated the change cart switch 1172 to maintain the backup relay 1156 energized.

The reset relay 1164 is an overload relay set to open the circuit for the motor start coil 1194 at an overload valve lower than that for which relays 1204 and 1206 are set. In the event of an overload condition, the relay 1164 opens contacts 1210 to restore the start coil 1194. The brake 1214 will be applied to stop the motor 1222 and the motor will be deenergized.

The brake 1214 may be energized to release the motor 1222 and the paddle 1270 for movement by manual operation of the switch 1162. The circuit for energizing the brake extends from one terminal of the three phase source over conductor 1263, contacts 1265 of switch 1162, conductor 1267, the brake 1214, and conductor 1269 to another terminal of the three phase source. In the event that a mail sack is jammed between a side of the chute 1272 and the paddle 1270, the switch 1162 will be actuated by an operator to free the paddle; and the paddle will be moved manually away from the mail sack. The freed mail sack can then be manually placed on the chute 1272, and contacts 1210 are manually closed.

The manual test switch 1161 includes contacts 1271 for operating the lock relay 1158 over a circuit extending from one terminal of the 110 volt source, conductor 1186, the coil 1182 of relay 1158, conductor 1273, contacts 1271 and conductor 1190 to the other terminal of the source. Operation of the lockup relay operates the transfer mechanism through one cycle. Recycling of the transfer mechanism may be obtained so long as the test switch 1162 is held in its actuated condition.

An additional test switch 1170 is provided physically adjacent the motor. When repair work is being done on the motor and it is desired to check its operation, the switch 1170 may be depressed to actuate the contacts 1290 to operate the transfer mechaism 48-1 through one or more cycles of operation. Closure of the contacts 1290 completes a circuit for energizing the lockup relay 1158 over a circuit extending from one terminal of the alternating current source through conductor 1186, the coil 1182 of the relay 1158, contacts 1290, conductor 1292, overload relay contacts 1200 and 1202, conductor 1208, contacts 1210 of the reset switch and conductor 1190 to the other terminal of the source. In the that the switch 1170 is thereupon released to its normal position, the transfer mechanism will go through one cycle of operation and shut off as described above. However, if the switch 1170 is maintained operated, the transfer mechanism will go through additional cycles of operation until the switch 1170 is released.

A lamp 1294 is provided to indicate an overload condition for the motor 1222. The lamp 1294 is normally maintained energized over a circuit extending from one terminal of the alternating current source through conductor 1186, the lamp 1294, conductor 1292, contacts 1200 and 1202 of the overload relays, conductor 1208, contacts 1210 of the reset switch, and conductor 1190 to the other terminal of the source. When an overload condition exists and the reset switch 1164 is operated to open the contacts 1210, the lamp 1294 is extinguished to indicate the presence of the overload condition. The lamp 1294 is preferably located in a readily visible position adjacent the transfer mechanism 48-1.

The right section 1152 of the transfer mechanism control circuit 92-1 is substantially the same as the left section 1150. Thus the section 1152 includes a motor start circuit 1300 having a starter coil 1302 which is effective upon energization to release an electric brake 1304 and to energize the transfer mechanism motor 1306.

The coil 1302 is in turn energized in the manner described above with respect to coil 1194 by means of a lockup relay 1308 which is operated and locked up incident to an input pulse from the decoder 90-1 placed upon the right input conductor 1310. The section 1152 includes a backup relay 1312 which is similar to and performs the same functions as the relay 1156 of the section 1150. The section 1152 also includes a disabling limit switch 1314, similar to switch 1168, for restoring the lockup relay 1308 and stopping the motor start circuit 1300 after each cycle of operation of the transfer mechanism.

A reset switch 1316 is provided for stopping the transfer mechanism 48-1 in the event of an overload condition. In the event of an overload condition, a lamp 1318 will be extinguished to indicate the condition. Test switches 1320 and 1322 similar respectively to switches 1170 and 1161 are provided for operating the transfer mechanism 48-1 through one or more cycles of operation for test purposes. A brake release switch 1324 similar to switch 1162 of the section 1150 is provided for releasing the brake 1304 in the event of stopping of the transfer mechanism due to an overload whereby the paddle 1280 of the transfer mechanism may be freely moved for example to its home position.

As indicated above, the section 1152 includes the home limit switch 1166 which, when the transfer mechanism 48-1 is being operated by way of the control section 1152, prevents operation of the transfer mechanism by the section 1150. A change cart switch 1330, a backup protection switch 1332, and a warning lamp 1334, similar to and performing the same functions as switches 1172 and 1174 and warning lamp 1256 of section 1150, are provided in the right section 1152. The backup protection switch 1332 will prevent operation of the transfer mechanism by the control section 1152 when the bags are piled up in the cart to the extent of leaving one of the bags on the chute 1282 to maintain the switch 1332 actuated. The change cart switch 1330 will render the control section 1152 incapable of operating the mechanism 48–1 when switch 1330 is depressed to permit carts to be changed. The lamp 1334 will give a visual indication of the actuation of either switch 1330 or 1332.

Each of the transfer mechanisms 48–1 to 48–n which is operated in either of two directions will have control circuits similar to 92–1 operated by decoder circuits such as 90–1. The transfer mechanism 48–n is operated in one direction only, and one section, such as 1150, is sufficient for controlling the transfer mechanism. Also, the home limit switch such as switch 1166 is not required.

The means for positioning the package on the main conveyor belt will now be described in more detail. It will be recalled that the packages must be loaded on the main conveyor belt by the loading mechanisms such as 46–1 with a high degree of accuracy in relation to the conveyor belt and the zones along the belt path. This is necessary so that the transfer mechanisms such as 48–1, the timing of which is accurate in relation to the zones, can cause their paddles such as 1270 and 1280 to strike each package at the proper instant to assure discharge of the packages into the relatively narrow chutes such as 1272 and 1282.

Figure 17:
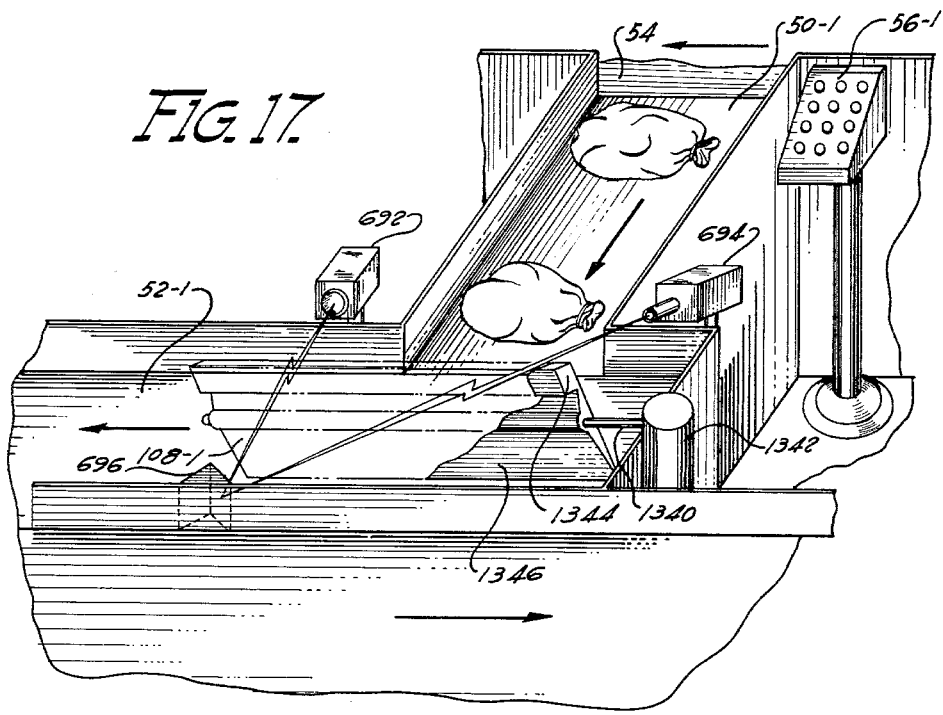
FIG. 17 is a fragmentary perspective view of a storage and load belt.

The pivoted positioning member 108–1 is carried on a pivot arm 1340 (FIG. 17). The pivot arm 1340 overlies the load belt 52–1 and is carried at one end thereof by a vertical post 1342 adjacent the end of the belt. The pivot arm is also spaced from the adjacent end of the storage belt 50–1 a distance somewhat greater than the maximum width of any package transferred from the storage belt to the load belt.

The positioning member 108–1 includes a weighted upper section 1344 and a tapered lower section 1346. The centers of gravity of the upper and lower sections are arranged such that the upper section in its normal at rest position tilts slightly away from the storage belt while the lower section is tilted slightly toward the storage belt. The pivot arm 1340 is elevated sufficiently above the level of the storage belt so that succeeding packages transferred from the storage belt to the load belt strike the lower section 1346 of the positioning member.

The positioning member is made sufficiently large and of sufficient weight to give it a high moment of inertia. The packages transferred from the storage belt to the load belt strike the lower portion 1346 sharply, but the high moment of inertia inhibits sudden movement of the positioning member. Each succeeding package will therefore fall adjacent the at rest position of the lower end of the positioning member for reliable and accurate transverse positioning at the center of the belt 52–1. This prevents accidental rolling of part of a package on the main belt and assures accurate longitudinal positioning of the packages on the load belt as well as on the main belt 42.

The sharp force applied to the positioning member by each succeeding package causes the lower end of the positioning member shortly thereafter to slowly pivot away from the package. Due to the very high moment of inertia, this movement will be vary slow in relation to the simultaneous movement of the package on the belt 52–1. Thus the package will be moved beyond the positioning member prior to the positioning member returning to its at rest position. At the same time, the delayed movement of the positioning member assures spacing between the package and the member as the package is moving along the side of the member, whereby there is no danger of the package being caught on or stopped by the member.

The circuits including the photo cell 694 and its light source 692 for positioning the trailing edge of each package on the load belt 52–1 have been described above. The diagonal portion of the light beam between the mirror 696 (FIG. 17) and the photo cell 694 assures detection of each succeeding package. The transverse portion of the light beam between the mirror and lamp assures reestablishment of the beam as each package reaches substantially the same position.

Thus the positioning member 108–1 assures the reliable transverse positioning of each succeeding package on the belt 52–1, and the circuits including the photo cell reliably stop the trailing edge of each package at the same longitudinal position before the paddle of the load mechanism 46–1. This transverse positioning of the packages on the load belt by the member 108–1 also positions each package substantially the same distance from the paddle of the load mechanism 46–1 for more reliable transfer of packages to the main belt.

As indicated above, the accurate positioning of the trailing edge of each package on the belt 52–1 and the accurate timing of the operation of the load mechanism 46–1 assure the accurate longitudinal positioning of said trailing edge of the package on the main belt 42. Since the direction of movement of the main belt is opposite that of the load belt, this traling edge now becomes the leading edge of the package. It has also been described above that the load mechanism 46–1 moves the packages against the backstop 102, whereby the packages assume a predetermined transverse position offset from the center of the belt.

However, since the paddles 1270 and 1280 must move an appreciable distance across the width of the belts to discharge packages and since mechanical shock and loading problems limit the speed of the paddles, it is necessary or at least desirable to position the packages close to the transverse center of the belt. If the packages are aligned with the center of the belt as they pass the transfer mechanisms, the time required for each paddle 1270 or 1280 to engage the packages will be substantially the same. Of course the width of the package will vary this time slightly.

But assuming that the packages are properly centered on the belt, the average time which is required by a paddle to engage the package subsequent to the transfer initiating pulse by the respective decoder can be taken into account in providing optimum discharge of packages to the chutes. The timing of the initiating pulse for optimum discharge may be selected by trial and error use of various output pulses from the pulse generator 100.

For example, if in the decoder 90–1 it is found that the use of the S1 conductor pulse to initiate the operation of the transfer mechanism control circuit 92–1 causes premature engagement of the paddles 1270 and 1280 with the packages, the next succeeding conductor S2 may be connected instead to S1 to the and circuit of the decoder 90–1 to cause the initiating pulse to be produced one-tenth of a second later or after an additional six inch movement of the package. Thus, assuming relatively perfect angular and transverse positioning of the package on the belt, optimum initiation of the transfer mechanism operation may be produced by selection of the proper output pulse conductor of the pulse generator 100.

Figure 20:
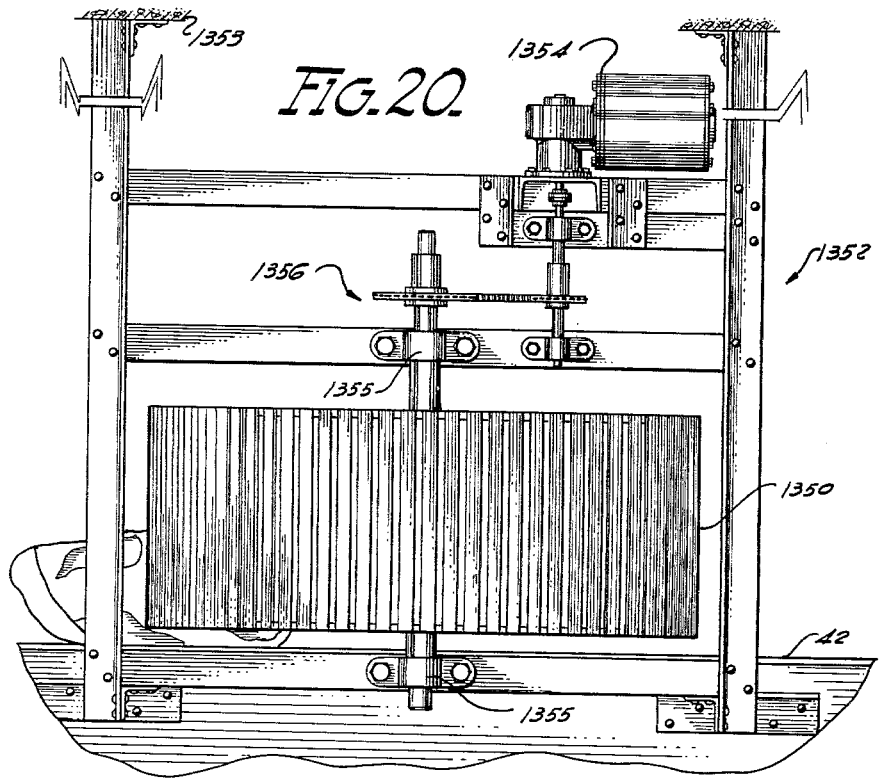
FIGS. 20 and 21 are fragmentary elevation and plan views of a means for centering packages transversely on the main conveyor belt.

Proper positioning of the leading edge of each package on the belt 42 by the means described above satisfies the longitudinal positioning. Proper angular positioning is satisfied by the weighted pivot member 108–1 and the backstop 102. The transverse positioning is achieved in one embodiment by the use of a rotating drum diverter 106 shown in FIGS. 1, 20 and 21 together with the sheet metal backstop 102. Each time that one of the load mechanisms 46–1 to 46–6 is operated to load a package on the belt 42, it firmly moves the package across the belt 42 to a position against the backstop 102. The package will move along with the belt adjacent the backstop 102 until it engages the peripheral surface 1350 of the drum 106. The peripheral surface 1350 of the drum preferably has a generally treadlike configuration to assure better gripping action between the surface and the packages.

The drum moves the package toward the center of the belt.

Figure 21:
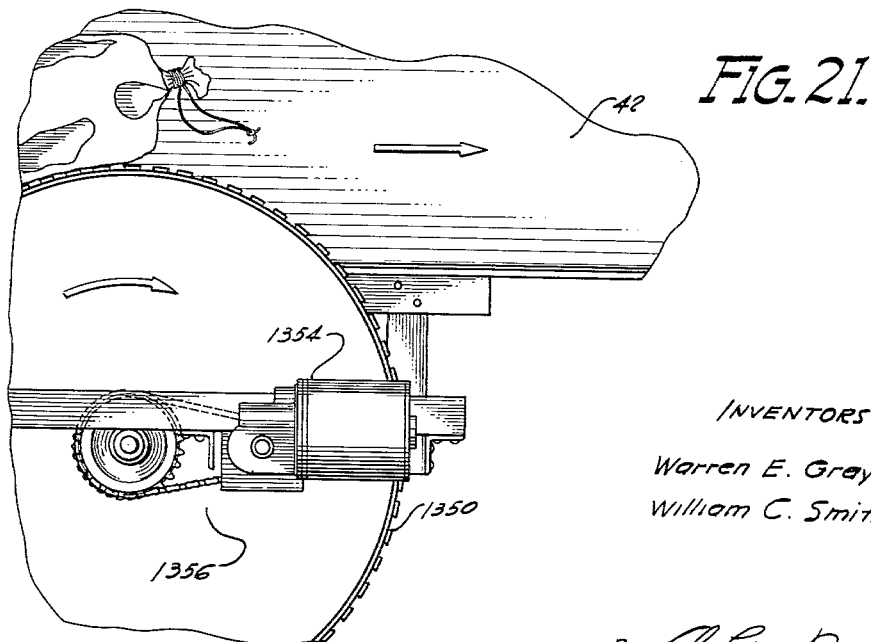

The drum 106 is supported on a suitable overhead frame structure 1352 suspended from a ceiling structure 1353 or the like. The frame includes a pair of pillow block bearings 1355 mounting the drum for rotation on a vertical axis. The axis is displaced to the side of the belt 42 as best seen in FIG. 21 with a small chordal portion of the drum extending over the upper surface of the belt.

This relationship of the drum axis offset with respect to the belt and with a relatively small portion of the drum surface overlying the belt is of substantial importance. For optimum package positioning the package must not be turned angularly or moved longitudinally with respect to the belt as it passes the drum 106. If the package were moved forwardly or rearwardly with respect to its position on the belt, its longitudinal positioning on the belt would be affected whereby the prepositioning of the package longitudinally as described above would be of little consequence. Angular turning of the package on the belt by the drum 106 would again destroy the longitudinal positioning. Turning of the package on the belt also destroys the parallel relation between the paddle-engaged surface of the package and the paddle. This results in erratic discharge of the packages, for example, angular discharge over the side of a chute rather than into the chute.

The drum 106 obviates these problems by positioning the packages transversely without substantially affecting the angular or longitudinal positioning of the packages on the belt. This is achieved by maintaining the speed of the peripheral surface 1350 of the drum at a speed which has a component in the direction of belt movement which is substantially the same as the belt speed. It will be appreciated that on a circular surface that, as we progress from one portion to the next, the component of movement in the direction of the belt movement will change. However, by maintaining only a small arcuate portion overlying the belt to engage the package, this change in the longitudinal component does not vary substantially. By selecting the medial position of the surface area which engages the packages—i.e., from the edge of the belt to a radial line perpendicular to the belt and intersecting the surface 1350—as having the longitudinal component exactly the same as belt speed, the slight variations therefrom on either side are in opposite directions and substantially cancel each other. In actual operation, a drum with a forty-four inch diameter overlying the belt seven and one-half inches and having a tangential velocity approximately 7% greater than belt velocity reliably centers the packages transversely without appreciably affecting their angular or longitudinal positions on the belt.

The drum diverter 106 is driven by a suitable motor 1354 and a gear reducer, chain drive assembly 1356. The motor and drive assembly are suitably supported by the frame 1352.

A second embodiment of the transverse positioning means for the packages is disclosed in FIGS. 22 and 23. In this embodiment, a belt diverter 1359 comprises a plurality of V-belts 1360, 1361 and 1362 carried by pulley assemblies 1363, 1364, 1365 and 1366. The belts are mounted vertically one above the other on spaced pulleys in each assembly. The pulley assembly 1366 is driven by a suitable motor 1367, gear reducer 1368 and belt and pulley assembly 1369. The belt diverter is supported by a suitable frame 1370.

A steel backup plate 1375 is adjusted to just barely ride against the inner surfaces of the belts. The plate has openings 1376 through which the pulleys project. Wood slots 1377, 1378 and 1379 are secured within grooves (not shown) in the plate 1375. The slats hold the belts in horizontal positions in line with their pulleys. The belts project about three-sixteenths of an inch beyond the slats.

In this embodiment as best seen in FIG. 22, straight line surfaces 1381, 1382 and 1383 are presented by the belts 1360, 1361 and 1362 to the packages rather than a circular surface. Along a straight line, the longitudinal component of the pulley belt movement will not vary and may be maintained at or substantially at the same speed as that of the main belt 42. In the preferred embodiment, the belt is maintained not in a single straight line, but in three straight line sections which form very small angles with respect to each other gradually approaching the direction of belt movement as they progress forwardly in the path of the belt. The pulley belt speed is preferably about 7% greater than main belt speed.

This arrangement is preferred in those instances in which it is necessary to move the packages a greater transverse distance. It will be recalled in this regard that if the transverse distance for moving the package is relatively large, the diverter drum 160 of FIGS. 1, 20 and 21 must have an unusually large diameter so that only a small portion projects over the belt. Otherwise, the change in the longitudinal component of the peripheral speed from position to position on the drum may cause turning of the package.

The use of the improved single stage transistorized binary counter circuit 934 (FIG. 12) in the multi-stage counter 1400 of FIG. 25 will now be described. The counter 1400 includes a plurality of stages 1402–1, 1402–2, 1402–3 to 1402–n. Each stage such as 1402–1 is essentially identical to circuit 934.

Thus, the stage 1402–1 includes a bistable flip-flop circuit with a pair of transistors corresponding to transistors 936 and 938. The transistors have output conductors 1404 and 1406 corresponding to conductors 947 and 949. The transistors also include input and circuits corresponding to circuits 937 and 939. A common input conductor 1408 is connected to the input and circuits and the output conductors 1404 and 1406 are each connected to the input of the opposite transistor. The output conductor 1404 forms the common input to the next stage 1402–2.

When the counter 1400 is in its normal condition with no binary number registered therein, each stage is set in its 0 state. The conductor 1404 will have ground potential applied thereto. This requires ground potential at the collector to which it is connected. If the collector is at ground potential, the transistor of which it forms a part must be conducting and the opposite transistor is nonconducting to apply a negative 64 volt potential to its collector and conductor 1406.

The succeeding stages 1402–2 and 1402–3 are similarly set; and, with no number registered in the counter 1400, their output conductors 1412 and 1414 have ground potential applied thereto. The output conductors 1416 and 1418 have a negative 64 volt potential applied thereto.

When a first negative 64 volt pulse is received over conductor 1408, the stage 1402–1 changes to its 1 state to apply ground potential to the output conductor 1406 and a negative 64 volt potential to conductor 1404. This negative potential on conductor 1404 merely prepares the stage 1402–2 for a change in state by charging the capacitor (similar to capacitor 957) in the base circuit of the conducting transistor in the stage 1402–2. Thus the number 1 is registered in the counter.

The next pulse on conductor 1408 shifts the stage 1402–1 to its original state 0 applying ground potential to conductor 1404 and the negative potential to conductor 1406. Ground potential on conductor 1404 applied to the charged capacitor in stage 1402–2 cuts off the conducting transistor to change the stage to its 1 state. Thus the binary number 01 equivalent to the decimal 2 is registered in the counter.

Succeeding pulses on the conductor 1408 will in a similar manner control the counter for registering the number of pulses received.

A description will now be made of the operation of the system for loading a first package on the storage belt 50–1 and routing the package to the discharge chute 1272.

It will be assumed that the load mechanism 46–1 has completed a cycle of operation to transfer a second package to the belt 42, that a third package, on the transfer belt 50–1, has been transferred to the load 52–1 and positioned by the latter belt before the mechanism 46–1, and that a fourth package, on the transfer belt 50–1, has been moved from a position adjacent the keyboard 56–1 to a position adjacent the load belt 52–1. The load station is now ready to accept the first package and its routing code.

An operator at the load station will take the first package from the feeder belt 54 and place it on the storage belt 50–1 adjacent the keyboard. The operator will note the address to which the package is to be directed and will depress a key in the keyboard 56–1 which produces a code assigned to the transfer mechanism being utilized to discharge packages for the address.

Figure 2:
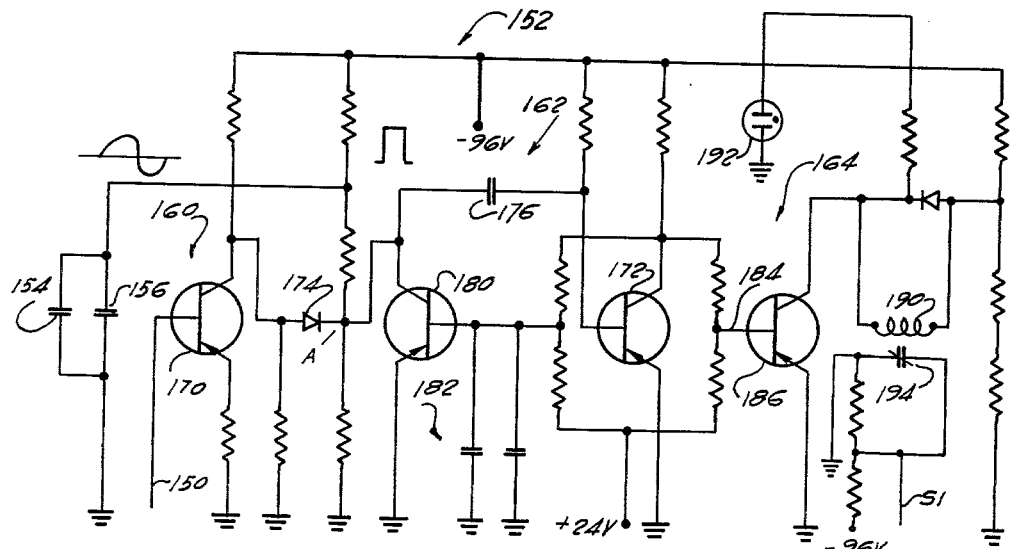
FIG. 2 is a schematic diagram of a portion of the timing pulse generator.

It is assumed that the first package is destined for the chute 1272 and that the depressed key actuates the switch 202 of FIG. 2. Thus when the switch 202 is actuated upon depression of the key, the routing code 10000001 will be formed on the bus bar conductors I to VIII.

Momentary application of a positive 24 volt potential to bus bars I and VIII in accordance with this code will cause the transistors 254–1 and 254–8 of FIG. 4 to momentarily conduct. The remaining six transistors 254–2 to 254–7 (not shown) in the keyboard entry circuit 60 will remain non-conducting.

When the transistors 254–1 and 254–8 conduct, they change the potential on their output lead 260–1 and 260–8 from a negative 64 volt potential to ground potential. This ground potential is applied to the zero output conductors 286–1 and 286–8 of the buffer memory stage 282 to cause the sections 280–1 and 280–8 to be set in their one states. The remaining six sections 280–2 to 280–7 (not shown) of the stage 282 remain in their zero states.

The key which has been actuated is released to return the switch 202 to its normal position and to cause the transistors 254–1 and 254–8 to return to their normal nonconducting conditions.

Figure 5:
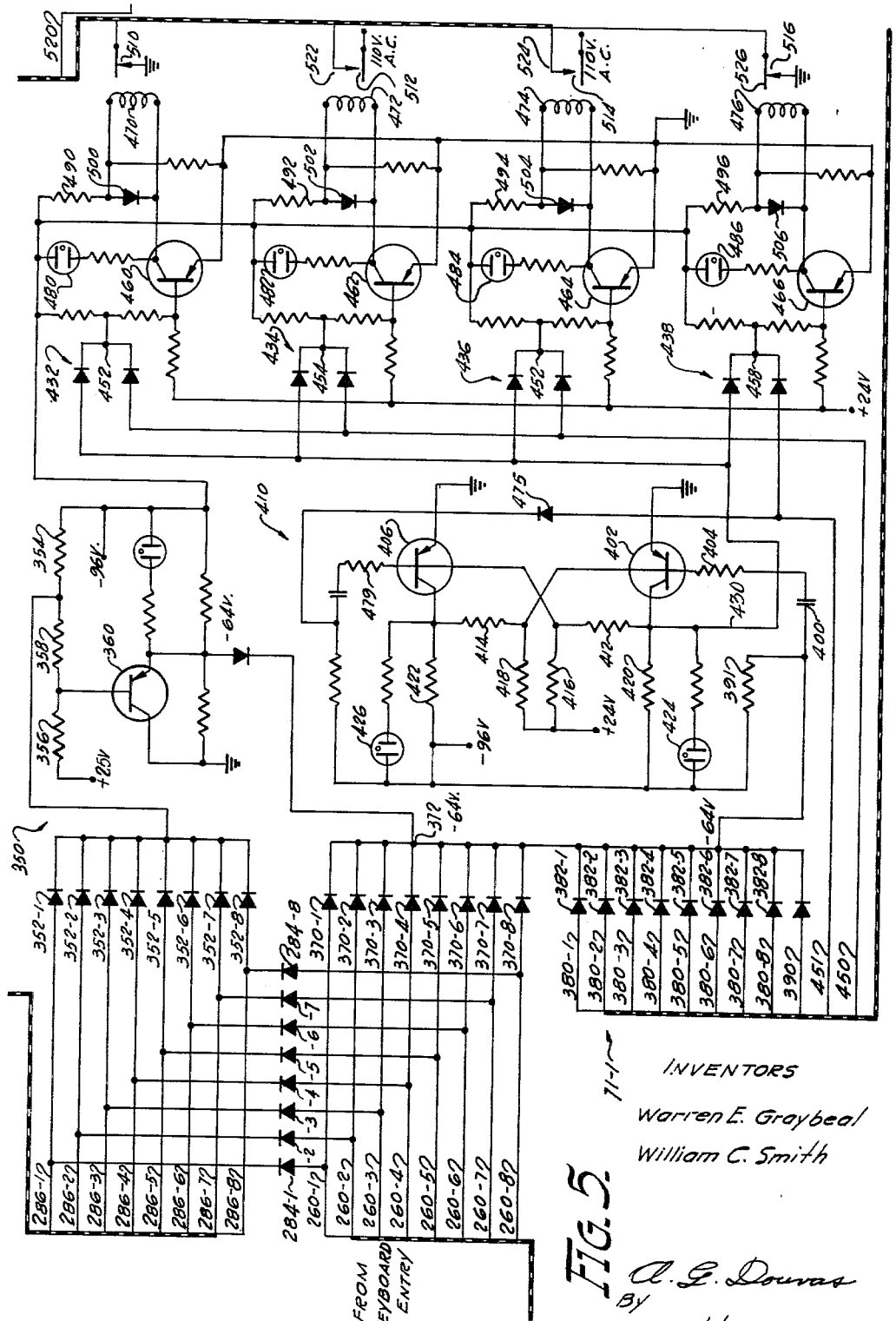
FIG. 5 is a schematic diagram of a portion of the input logic circuit for entering routing codes into the first stage of a buffer memory unit.
Figure 6:
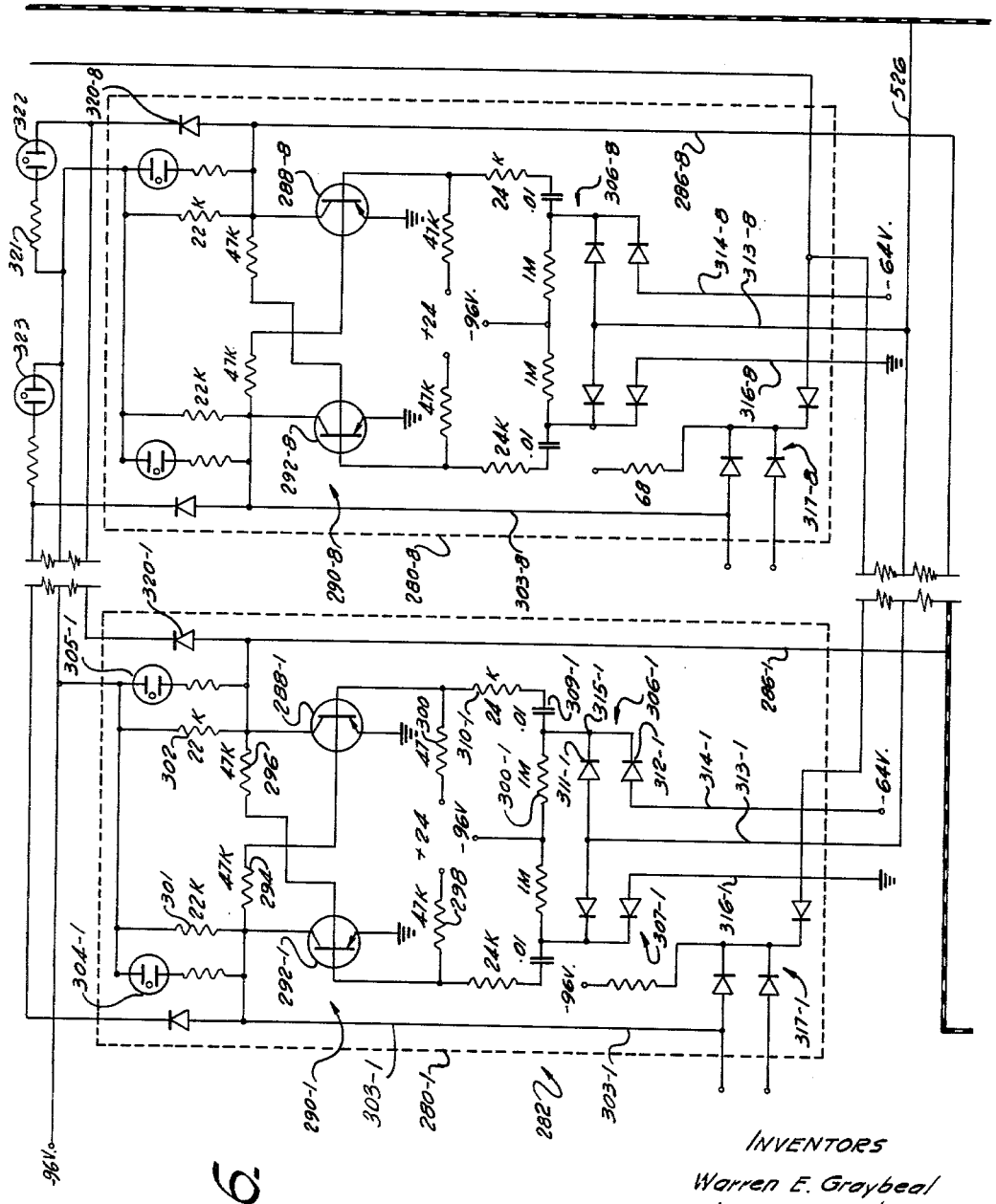
FIG. 6 is a schematic diagram of a portion of a buffer memory unit.

With all of the transistors in the keyboard entry circuit 60 nonconducting, they will condition the and circuit 350 of FIG. 5 for operation of the storage belt 50–1 and the load mechanism 46–1 to transfer the third package which is positioned in front of the mechanism from the load belt 52–1 to the main belt 42.

The code 10000001 in the buffer memory stage 282 will cause the normally conducting transistor 360 in the input logic circuit of FIG. 5 to be cut off, thereby to further condition the and circuit 350 for operation of the storage belt 50–1 and the load mechanism 46–1.

When the second package, which was previously loaded on the belt 42 by the load mechanism 46–1, advances five feet, and therefore out of the zone within which the load mechanism is positioned, its routing code will be transferred from the first stage 82–1 to the second stage 82–2 of the main memory. The eight sections of the main memory stage 82–1 are reset to their zero states. This further conditions the and circuit 350 for operation of the load mechanism and storage belt.

When the next timing pulse is applied to the fourth and final input 390 to the and circuit 350, the and circuit will cause the master control flip-flop circuit 410 to switch from its one to its zero condition. This will apply a negative 64 volt potential to inputs of the four and circuits 432, 434, 436 and 438 of the input logic board.

One-tenth of a second later the next timing pulse will be applied to the conductor 450 (FIG. 5) to open the three and circuits 432, 434, 436 to operate the relays 470, 472 and 474. The relay 474 will initiate the operation of the load mechanism 46–1 to transfer the third package from the load belt 52–1 to the main belt 42.

The relay 472 initiates the operation of the storage belt to transfer the fourth package to the load belt and to advance the first package to a position adjacent the load belt. The fourth package triggers the photo cell control circuit 700 of FIG. 7 to operate the load belt. The load belt positions the trailing edge of the fourth package accurately with respect to the load mechanism and stops.

The relay 470 will cause the transfer of the code in the third buffer memory stage 327, which corresponds to the third package, to the first stage 82–1 of the main memory. This transfer is accomplished by way of the input logic board transistors 540–1 to 540–8, and their input and circuits 550–1 to 550–8 which are connected to the one output leads of the third stage of the buffer memory and to the contacts 510 of the relay 470.

The next timing pulse applied to conductor 451 (FIG. 5) one-tenth of a second later operates relay 476. The relay 476 causes the routing codes of the first and fourth packages to be shifted from the first and second stages 282 and 325 of the buffer memory respectively to the second and third stages 325 and 327.

The next two succeeding load cycles similar to the cycle described above cause the transfer of the first package code to the third buffer memory stage 327 and then to the first main memory stage 82–1. At the same time, the first package will be advanced first to a position on the load belt 52–1 and then to the main belt 42. The sections 600–1 and 600–8 of the main memory stage 82–1 are switched to their one states, and the remaining six stages 600–2 to 600–7 (not shown) remain in their zero states.

As the first package advances from zone to zone along the conveyor belt path, the routing code is advanced from stage to stage in the main memory. When the routing code arrives in the stage 82–8 of the main memory, the circuit 1000 (FIG. 13) of the decoder 90–1 will be conditioned for operation by the code. This assumes that the male plug 1072 of FIG. 16 is used to assign the code 10000001 to the left section 1150 of the control circuit 92–1 of FIGS. 15 and 15A for operating the transfer mechanism 48–1 to transfer the package from the belt 42 to the chute 1272.

One-tenth of a second later a timing pulse is applied to the conductor S1 and extended to the conductor 1005 (FIG. 13) to cause conduction of the transistor 1016 of the decoder and operation of the contacts 1050 by the relay coil 1020. The contacts 1050 apply a start pulse to the control circuit 92–1 to energize the lockup relay 1158. The relay 1158 energizes the motor start coil 1194 to release the brake 1214 and to cause energization of the motor 1222.

The motor drives the transfer mechanism 48–1 through one cycle of operation, the paddle 1270 discharging the package from the belt 42 to the chute 1272. As the transfer mechanism approaches the end of its operating cycle, the disabling limit switch 1168 will restore the lockup relay 1158. The motor start coil 1194 restores, and the brake 1214 is rendered effective to bring the motor 1222 to a stop. The transfer mechanism and its control circuit are suitably adjusted so that the paddle 1270 comes to a stop at its normal home position.

Figure 12:
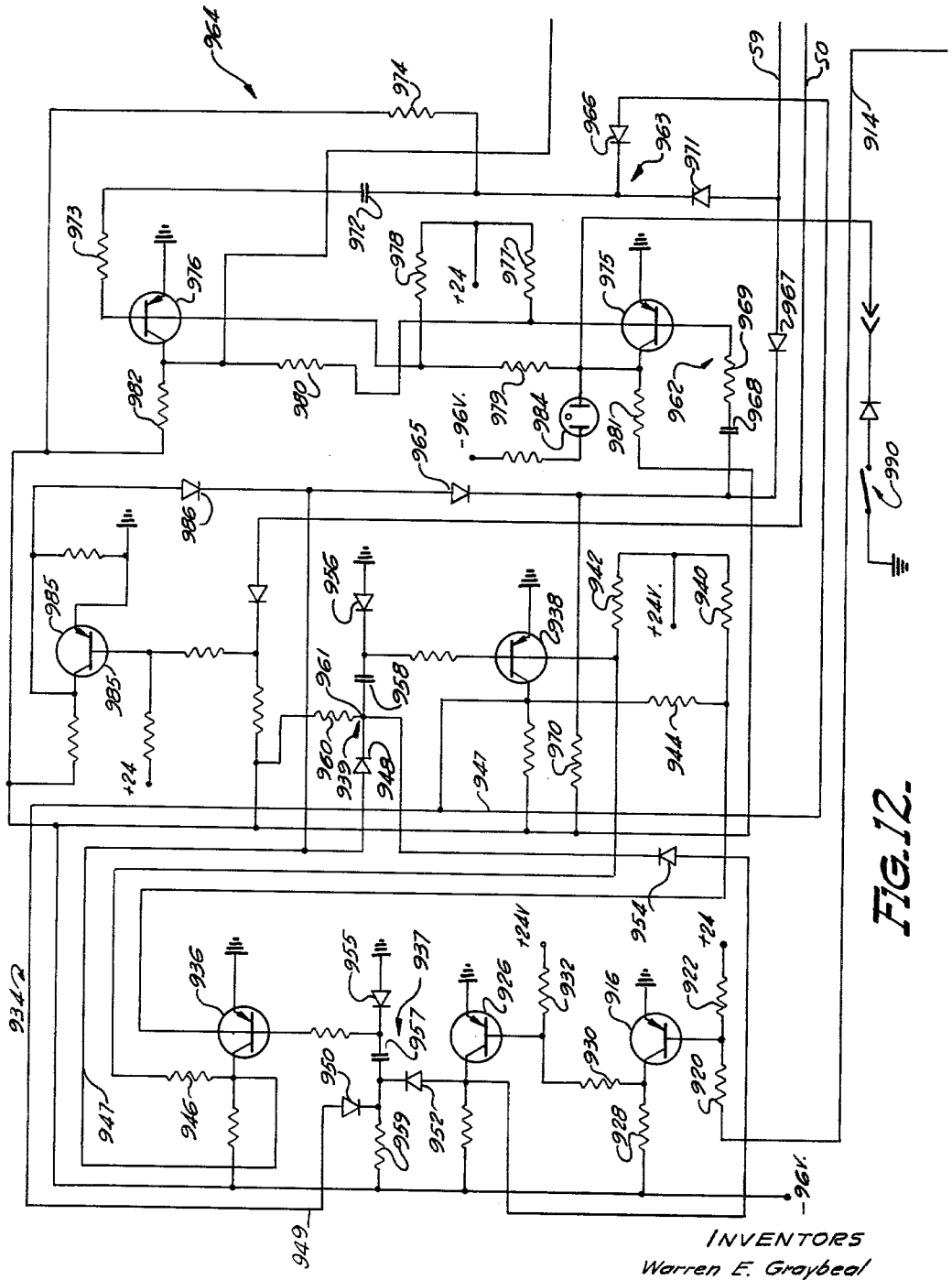
FIG. 12 is a schematic diagram of an improved counter utilized in a parity checking circuit associated with the main memory unit.

As the routing code is advanced as described above through the buffer memory and through the main memory, it will be periodically checked by the parity check circuits such as those shown in FIG. 12 to determine the presence of an even number of one bits in the code or an odd number of one bits, the latter indicating an error.

The presence of a parity error in one of the buffer memory units will be detected by reason of the extinguished condition of its neon tube 992 (corresponding to tube 984 of FIG. 12) displayed on the panel 907 of FIG. 24.

Parity errors in the shift register stages of the main memory will be discovered only in the event that an operator is watching the panel 907 when an error is detected. The parity error neon tubes 984 are only momentarily extinguished upon detection of an error because the sampling flip-flop circuits of the parity check circuits are reset one second after the detection of an error.

The movement of routing codes through the main memory unit in synchronism with the movement of their packages along the belt may be observed by means of the neon bulbs 905 displayed on the panel 907. Each time that a code becomes entered in one of the stages, the corresponding neon bulb 905 will become energized. As soon as no routing code exists in the stage, the neon tube will be extinguished. During testing procedures, all ones may be entered into the first stage of the main memory by means of the test key 856 of FIG. 10 which will cause the extinguishing of the corresponding neon tube 899. As the code, comprising all ones, is advanced through the succeeding stages, the succeeding neon tubes 899 will be extinguished and then energized.

A keyboard (not shown) similar to 56–1 may be positioned adjacent the panel 926 for test purposes. It will be connected so as to enter information into the main memory in some position prior to the first transfer mechanism. An operator will actuate the respective keys for operating the transfer mechanisms one at a time and the operation of the decoder circuits which will initiate the operation of the transfer mechanism may be determined by watching for the energization of the respective neon tubes 1102 and deenergization of the respective neon tubes 1058.

While there has been described what is believed to be the preferred embodiment of the present invention, it will be appreciated that various changes and modifications may be made therein; and it is contemplated to cover in the appended claims all such changes and modifications as fall within the true spirit and scope of the invention.

What is claimed is:

1. In a conveyor system of the type in which a main belt transports packages loaded thereon toward discharge stations along its path, in which transfer mechanisms are provided at the stations for removing packages from the belt, and in which an electrical control system having a manually operated keyboard producing coded routing information for each package loaded on the belt is controlled by the information to selectively operate the transfer mechanisms for removing the packages at selected discharge stations, in combination therewith a package load mechanism adjacent the belt path, a storage belt on which packages are manually loaded and a load belt, said load belt operable in a direction opposite to said main belt, a buffer memory interposed between the keyboard and the control system receiving and storing routing information for each package incident to the operation of the keyboard, means moving the storage and load belt in steps to advance the packages to a load position at which the lagging edge thereof on the load belt is stopped at a predetermined point adjacent the load mechanism for transfer to the main belt, means advancing the routing information in the buffer memory coincident with the movement of the packages on the storage and load belts, and circuit means initiating the operation of the load mechanism and transferring routing information of transferred packages from the buffer memory to the control system.

2. In a conveyor system of the type in which a main belt transports packages loaded thereon toward discharge stations along its path, in which transfer mechanisms are provided at the stations for removing packages from the belt, and in which an electrical control system is controlled by package routing information to selectively operate the transfer mechanisms for removing the packages at selected discharge stations, in combination therewith a plurality of load mechanisms adjacent the belt path, a manually loaded storage belt and a load belt for each load mechanism, said load belt operable in a direction opposite to said main belt, a buffer memory for each load mechanism receiving and storing routing information for each package placed on the respective storage belt, means moving the storage and load belts in steps to advance the packages to load positions, said load belt operable in a direction opposite to said main belt, adjacent the load mechanisms for transfer to the main belt, means advancing the routing information in the buffer memories coincident with the movement of the packages toward the load positions, and circuit means initiating the operation of the load mechanisms and transferring routing information of transferred packages from the buffer memory to the control system.

3. In a conveyor system of the type in which a main belt transports packages loaded thereon toward discharge stations along its path, in which transfer mechanisms are provided at the stations for removing packages from the belt, and in which an electrical control system including a timing means is controlled by package routing information to selectively operate the transfer mechanisms for removing the packages at selected discharge stations, in combination therewith a plurality of load mechanisms positioned along the belt path, a storage belt and a load belt for each load mechanism, said load belt operable in a direction opposite to said main belt, a multistage buffer memory for each load mechanism receiving and storing routing information for each package placed on the storage belt, means responsive to the timing means when routing imformation is registered in each stage of a buffer memory and when the main belt adjacent the load mechanism is empty for moving the respective storage and load belts one step to advance their packages toward a load position adjacent the load mechanism for transfer to the main belt, for initiating the operation of the load mechanism to transfer a package from the load position to the main belt, for advancing the routing information in the buffer memory one stage and for transferring the routing information of the transferred package from the buffer memory to the control system and means responsive to the package transferred from the storage belt to the load belt for stopping said load belt at a position at which the lagging edge of the package on the load belt is stopped at a predetermined position with respect to said load mechanism.

4. In appartus of the type in which a conveyor system is operated by an electrical timing means for automatic removal at selected discharge stations of packages placed on the conveyor, in combination therewith a power operated load mechanism, a power operated storage belt upon which packages are placed manually, a power operated load belt operable in an opposite direction to said conveyor system receiving packages from the storage belt and positioning the packages for transfer to the conveyor by the load mechanism, additional timing means periodically operating the load mechanism to transfer packages from the load belt to the conveyor and advancing the storage belt in steps to transfer packages to the load belt, circuit means effective upon the transfer of each package to the load belt to advance the package toward the load mechanism, said circuit means comprising a photosensitive device, a source of light for the device interruptable by each package received from the storage belt and means responsive to the interruption of said light source to control the advancement of said package by the load belt so that the lagging edge of said package on the load belt is advanced to a predetermined position relative to the load mechanism.

5. In apparatus of the type in which a system having a main conveyor belt is operated by an electrical timing means for automatic removal at selected discharge stations of packages placed on the belt, in combination therewith a power operated load mechanism, means including a load belt parallel to the main belt and operable in an opposite direction from said main belt for receiving packages to position same adjacent the load mechanism for transfer to the main belt, additional timing means periodically operating the load mechanism to transfer packages from the load belt to the main belt, a photocell and light source transversely arranged across said belt and circuit means responsive to the reestablishment of the light beam on said cell subsequent to the passage of a package for stopping said load belt a predetermined time after the re-establishment of said light beam.

6. In a conveyor system of the type in which a main belt transports packages loaded thereon toward discharge stations along its path, in which transfer mechanisms are provided at the stations for removing packages from the belt, and in which an electrical control system including a timing means is controlled by package routing information to selectively operate the transfer mechanism for removing the packages at selected discharge stations, in combination therewith a plurality of load mechanisms positioned along the belt path, a storage belt for each load mechanism, a load belt for each load mechanism parallel to the main belt and operable in an opposite direction from said main belt for receiving packages to position same adjacent the load mechanism for transfer to the main belt, photocell and a light source transversely arranged across each load belt, circuit means associated with each photocell responsive to reestablishment of the light beam on said photocell subsequent to the passage of a package thereby for stopping the load belt a predetermined time interval after the reestablishment of said light beam, a multistage buffer memory for each load mechanism receiving and storing routing information for each package placed on the storage belt, means responsive to the timing means when routing information is registered in each stage of the buffer memory and when the main belt adjacent the load mechanism is empty for moving the respective storage and load belts one step to advance their packages toward a load position adjacent the load mechanism for transfer to the main belt, for initiating the operation of the load mechanism to transfer a package from the load position to the main belt, for advancing the routing information in the buffer memory one stage and for transferring the routing information of the transferred package from the buffer memory to the control system.

7. In apparatus of the type in which a system having a main conveyor belt is operated by an electric timing means for automatic removal at selected discharge stations of packages placed on the belt, in combination therewith a power operated load mechanism, means including a load belt parallel to the main belt receiving packages for positioning adjacent the load mechanism for transfer to the main belt, additional timing means periodically operating the load mechanism to transfer packages from the load belt to the main belt, means sensing the physical position of each package received on the load belt for causing the movement of the load belt until a package is moved to a predetermined position in relation to the load mechanism to assure accurate longitudinal positioning of the package on the main belt, a backstop against which the automatically loaded packages are directed for positioning offset with relation to the transverse center of the main belt and means overlying the belt including a movable diverter surface projecting progressively toward the central portion of the main belt, having a velocity component in the direction of main belt movement substantially equal to the speed of the belt and engaging the packing to urge the packages towards the transverse center of the belt without effecting their longitudinal or angular positioning on the main belt.

References Cited by the Examiner
UNITED STATES PATENTS

| | | | |
|---|---|---|---|
| 1,733,221 | 10/1929 | Fuller | 198—29 |
| 1,843,281 | 2/1932 | Hoodless | 198—29 |
| 2,717,086 | 9/1955 | Bush | 214—11 |
| 2,789,710 | 4/1957 | Desjardins | 214—89 |
| 2,903,687 | 9/1959 | Baer | 340—365 |
| 2,923,420 | 2/1960 | Dyer | 214—11 |
| 2,971,101 | 2/1961 | Hurst | 307—88.5 |
| 2,972,068 | 2/1961 | Clark | 307—88.5 |
| 2,973,506 | 2/1961 | Newby | 340—146.1 |
| 2,974,305 | 3/1961 | Morris | 340—147 |
| 2,977,003 | 3/1961 | Muller | 214—11 |
| 2,990,965 | 7/1961 | Smoll | 214—11 |
| 3,000,519 | 9/1961 | Purnell | 214—11 |
| 3,031,646 | 4/1962 | Reinholtz | 340—146.1 |
| 3,033,366 | 5/1962 | Atanasoff | 214—11 X |
| 3,084,784 | 4/1963 | Zoubek | 198—38 |
| 3,105,601 | 10/1963 | Smoll | 214—11 |

FOREIGN PATENTS 632,403  11/1949  Great Britain.

GERALD M. FORLENZA, *Primary Examiner.*

CLAUDE A. LEROY, MORRIS TEMIN, HUGO O. SCHULZ, *Examiners.*

UNITED STATES PATENT OFFICE
CERTIFICATE OF CORRECTION

Patent No. 3,223,255                                    December 14, 1965

Warren E. Graybeal et al.

It is hereby certified that error appears in the above numbered patent requiring correction and that the said Letters Patent should read as corrected below.

In the grant, line 2, after "Illinois," insert -- assignors to Stewart-Warner Corporation, of Chicago, Illinois, a corporation of Virginia, --; line 11, for "Warren E. Graybeal and William C. Smith, their heirs" read -- Stewart-Warner Corporation, its successors --; in the heading to the printed specification, lines 4 and 5, for "Warren E. Graybeal, 206 W. Elm St., Stillwater, Minn., and William C. Smith, 377 Fairview, Elmhurst, Ill." read -- Warren E. Graybeal, Stillwater, Minn., and William C. Smith, Elmhurst, Ill., assignors to Stewart-Warner Corporation, Chicago, Ill., a corporation of Virginia --; column 34, lines 3 and 4, strike out ", said load belt operable in a direction opposite to said main belt," and insert instead -- at which the lagging edges thereof are stopped at a predetermined point --.

Signed and sealed this 20th day of December 1966.

(SEAL)
Attest:

ERNEST W. SWIDER                                  EDWARD J. BRENNER
Attesting Officer                            Commissioner of Patents